(12) United States Patent
Sarkar et al.

(10) Patent No.: US 10,656,917 B2
(45) Date of Patent: May 19, 2020

(54) GENERATION OF A DEVICE APPLICATION

(71) Applicant: Microsoft Technology Licensing, LLC, Redmond, WA (US)

(72) Inventors: Jaideep Sarkar, Redmond, WA (US); Olivier Colle, Bellevue, WA (US); Prithvi Raj Balaram, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/984,293

(22) Filed: May 18, 2018

(65) Prior Publication Data
US 2018/0275968 A1    Sep. 27, 2018

Related U.S. Application Data

(63) Continuation of application No. 14/981,058, filed on Dec. 28, 2015, now Pat. No. 10,001,976.

(51) Int. Cl.
| G06F 8/30 | (2018.01) |
| G06F 8/34 | (2018.01) |
| G06F 3/0484 | (2013.01) |
| G06F 8/20 | (2018.01) |
| G06F 8/41 | (2018.01) |

(52) U.S. Cl.
CPC ............ *G06F 8/30* (2013.01); *G06F 3/04842* (2013.01); *G06F 8/20* (2013.01); *G06F 8/34* (2013.01); *G06F 8/433* (2013.01)

(58) Field of Classification Search
None
See application file for complete search history.

(56) References Cited

U.S. PATENT DOCUMENTS

| 9,069,567 B1* | 6/2015 | Sams | G06F 8/30 |
| 2009/0313004 A1* | 12/2009 | Levi | G06F 8/30 |
| | | | 703/28 |
| 2011/0055427 A1* | 3/2011 | Das | H04L 67/06 |
| | | | 709/247 |
| 2012/0270505 A1* | 10/2012 | Prakash | H04L 69/26 |
| | | | 455/66.1 |
| 2013/0073730 A1* | 3/2013 | Hansson | G06F 9/5044 |
| | | | 709/226 |
| 2013/0304631 A1* | 11/2013 | Wang | G06Q 20/12 |
| | | | 705/39 |
| 2014/0310612 A1* | 10/2014 | Lu | G06F 3/04842 |
| | | | 715/748 |
| 2014/0310619 A1* | 10/2014 | Fickenwirth | G06F 3/048 |
| | | | 715/762 |
| 2014/0313278 A1* | 10/2014 | Periyannan | H04L 65/403 |
| | | | 348/14.08 |

(Continued)

*Primary Examiner* — Daxin Wu

(57) ABSTRACT

Examples of the disclosure enable the recalculation of device chaining in a user interface. In some examples, a first element representing a first hardware device is received at a design surface of a computing device user interface. A second element representing a second hardware device is received at the design surface. A selection of an output associated with the first element is received. A function that binds a property of the second element to a property of the output associated with the first element is automatically generated. Aspects of the disclosure enable the automatically generated function to be displayed at the design surface.

20 Claims, 18 Drawing Sheets

(56) References Cited

U.S. PATENT DOCUMENTS

| | | | |
|---|---|---|---|
| 2015/0319101 A1* | 11/2015 | Tsao | G06F 9/526 709/226 |
| 2016/0050160 A1* | 2/2016 | Li | H04L 63/0442 713/176 |
| 2017/0315767 A1* | 11/2017 | Rao | G06F 3/147 |

* cited by examiner

US 10,656,917 B2

GENERATION OF A DEVICE APPLICATION

CROSS REFERENCE TO RELATED APPLICATION

This application is a continuation of and claims priority to U.S. application Ser. No. 14/981,058, entitled "GENERATION OF A DEVICE APPLICATION," filed Dec. 28, 2015, which is incorporated herein in its entirety.

BACKGROUND

Creating an executable computer program generally involves generating algorithms, verifying the correctness of the algorithms, and implementing the algorithms into a programming language. This process often requires expertise in many areas, including coding in the target programming language. Generating a program for a hardware device typically requires specific knowledge of the device protocols and capabilities.

Recalculation software, such as spreadsheet or worksheet software for example, has allowed for declarative transformation between a data source and a data sink. For any given set of transformations connecting various data sources and data sinks, the output of the data source may be consumed by the data sink, or the output of the data source may be subject to transformations prior to being consumed by the data sink. These various transformations are evaluated, which results in one or more outputs represented throughout the recalculation document, such as a spreadsheet document. A user may add and edit the declarative transformations, such as by modifying values in a cell, without having in-depth knowledge of coding, and this editing automatically causes the transformations to be recalculated, which may cause a change in one or more outputs.

The Internet of Things (IoT) refers to the network of physical objects embedded with electronics, software, sensors, and network connectivity capabilities. These physical objects, sometimes referred to as "smart devices", are capable of collecting data and exchanging data. However, smart devices typically are limited to communicate via a set protocol and often may only exchange data with other proprietary devices or services dictated by the device manufacturer.

SUMMARY

Examples of the disclosure provide for generating an executable program using at least two hardware elements. A first element representing a first hardware device is received at a design surface of a computing device user interface. A second element representing a second hardware device is received at the design surface. A selection of an output associated with the first element is received, and a function is automatically generated that binds a property of the second element to a property of the output associated with the first element. Aspects of the disclosure further enable the automatically generated function to be displayed at the design surface, visually exposing the logic that ties the two elements together, and thus ties together the two hardware devices within a network.

In another aspect, a computing device for generating an executable program is provided. The computing device includes a processor and a user interface, implemented on the processor that receives hardware nodes representing hardware devices and software nodes. The computing device also includes a code generator, implemented on the processor that includes obtaining an expression generated at the user interface. The code generator analyzes the obtained expression for dependencies between the hardware nodes and the software nodes. The code generator further generates a dependency graph based on the analyzed expression and generates executable code based on the generated dependency graph. Aspects of the disclosure enable the generated executable code to be displayed at the user interface.

In yet another aspect, one or more computer storage media having computer-executable instructions embodied thereon for generating an executable program are provided. The instructions include receiving a source component representing a source device at a user interface. A destination component representing a destination device at the user interface is received. A selection of an output is received which is an output from the source device that is an input to the destination device. A function that binds a property of the destination device to a property of the output from the source device is automatically generated. Aspects of the disclosure enable the automatically generated function to be displayed at the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
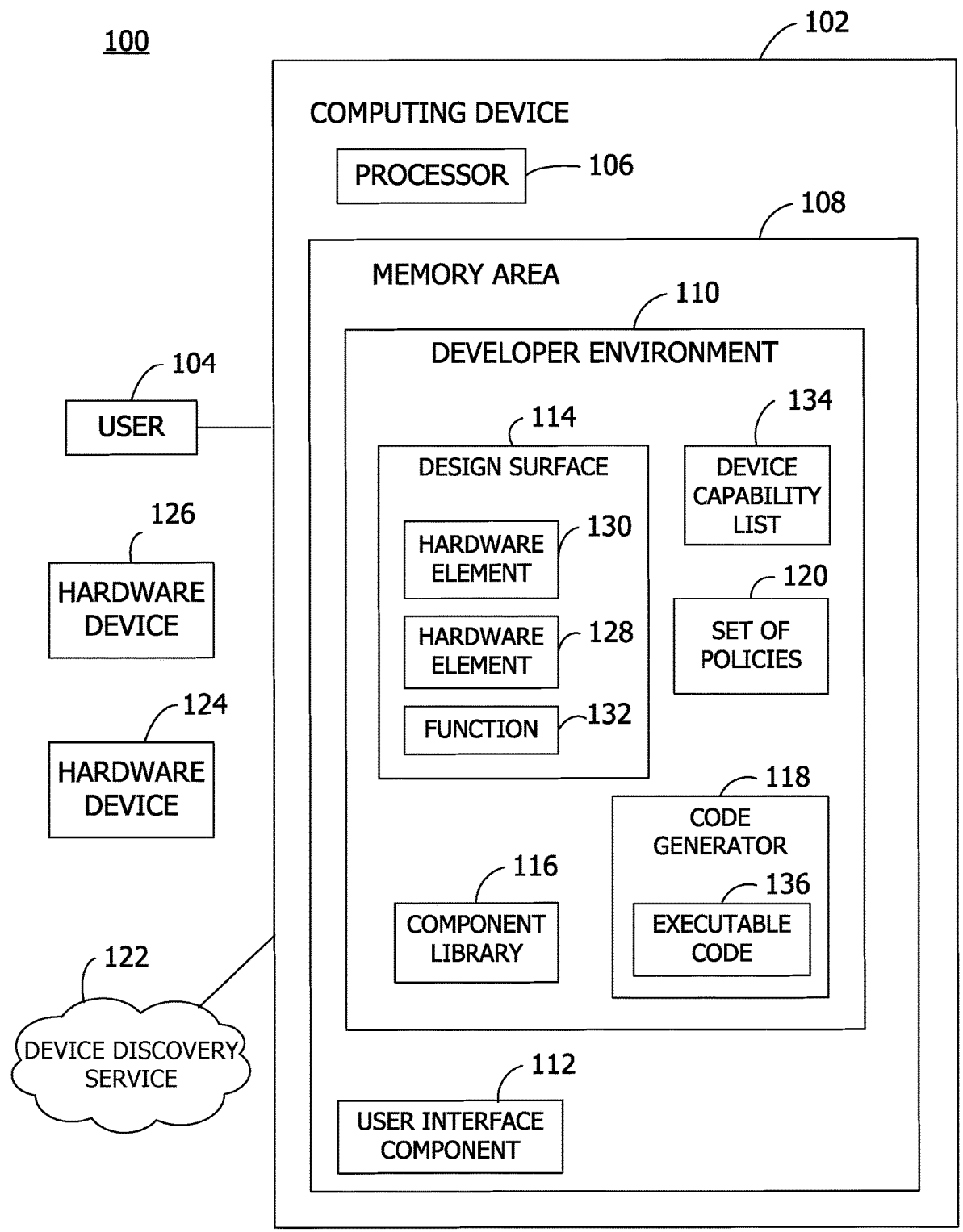
FIG. 1 is an exemplary block diagram illustrating a computing device for generating an executable program.

Referring to the figures, examples of the disclosure enable the automatic generation of executable code to bind hardware devices to a transformation chain. In some examples, the output of one device serves as the input of another device. The chaining of the devices may not require any programming ability and may be able to work across different communication protocols. Examples of this disclosure provide for adding a hardware device as a data source or data sink, or both, to a declarative transformation chain, such that removal or addition of a hardware device from the chain results in recalculation of the generated device chain. Additionally, the outputs of selected hardware devices may be the values of the data sinks used as input to another hardware device.

Examples of the disclosure enable chaining together different devices, and different types of devices, regardless of device type and any supported protocols of selected devices. By enabling transformation chains that include interaction between both software and hardware nodes, within the context of a recalculation user interface, a multi-device authoring environment is provided. Further, communication between devices is facilitated by aspects of this disclosure that may deserialize data transport types of different devices into runtime entities, allowing interaction with other runtime entities, representing either a software transform or a transform that spans multiple devices, or both, providing a multi-device authoring environment with knowledge of multiple device capabilities and data transport types.

Aspects of the disclosure provide for effectively and efficiently creating a device chain. For example, a representation of a first device and a representation of a second device may be received at a design surface of a computing device user interface. A selection to tie a property of one device to a property of the other device is received, and an executable program may be automatically generated based on the received selection. In this manner, a non-technical user may be provided the advantage of designing an executable program for hardware devices within a network without having to determine compatibility or providing programming details via code. Selection of devices and properties to bind together may be received via user gestures or user interactions with visual elements of a user interface, in some examples.

Moreover, examples of the disclosure enable a user to select an output associated with one hardware device and bind a property of another hardware device to a property of that selected output, such that the automatically generated executable code is a transformation chain with hardware as one or more nodes in the chain. Aspects of the disclosure further enable the automatically generated expressions to be displayed at the design surface, visually exposing the code automatically generated based on user selection. This allows the functionality to be viewable for inspection or modification as the user sees fit. Non-developer users may modify aspects of the code that are visually exposed at the design surface, through selection of visual elements in some cases, which may also help increase their understanding of a device and device capabilities, as well as improving user technical acumen.

Further aspects of this disclosure allow for the automatic generation of executable code that is a compiled transformation chain, which may itself run on a piece of hardware, regardless of whether a user interface is associated with the piece of hardware executing the code. Rather than a hardware device communicating with an application programming interface, which in turn communicates with a service, aspects of this disclosure provide for compiled transformation chains that may run on the hardware device itself, as headless code for example.

The methods, media, and systems described herein may be implemented using computer programming or engineering techniques including computer software, firmware, hardware or a combination or subset thereof. Interfacing smart devices into a transformation chain generally requires software transformation and dedicated device-specific code. Aspects of this disclosure expose the input and output functionality of multiple smart devices in a design environment, improving user accessibility as well as accuracy of a device-chaining creation process. In addition, examples of the disclosure increase accuracy of executable code at runtime by automatically generating the executable code based on user selections of the visually exposed functionality, thereby removing inadvertent coding errors.

Additionally, the examples described herein enable executable code for devices to be automatically generated and modified in an efficient and effective manner based on user selection of visually exposed device capabilities at a design surface user interface. By generating the executable code as described in this disclosure, some examples reduce processing load and/or increase processing speed by strategically managing computational, processing, memory, and/or other resources. The effect of adding hardware to a transformation chain, based on user selection to automatically generate an application that binds together two or more hardware devices, improves performance of the application as well as one or more devices hosting the application. Additionally, some examples may conserve memory, reduce network bandwidth usage, improve operating system resource allocation, and/or improve communication between devices by streamlining at least some operations, such as by pushing the executable code to one or more devices to run as headless code at the device. As used herein, headless code refers to non-graphical user interface (non-GUI) executable code.

Referring to FIG. 1, an exemplary block diagram illustrates an operating environment 100 for generating executable code. In the example of FIG. 1, the computing device 102 associated with a user 104 represents a system for application design. The computing device represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

Computing device 102 is configured to receive, store, and transmit data (such as user input, device input data, device output data, programming code, graphical data, dependency data, operating system data, etc.) with respect to other computing devices. The terms "computing device" and "computer" may be used interchangeably throughout.

In some examples, the computing device has at least one processor 106, a memory area 108, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 3 and FIG. 4).

In some examples, the processor represents an implementation of analog techniques to perform the operations described herein. For example, the operations may be performed by an analog computing device and/or a digital computing device.

In computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include developer environment 110, which may represent an application for designing other executable applications. The applications may communicate with counterpart applications or services such as web services accessible via a network (not shown). For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. The terms "memory area" and "memory" may be used interchangeably throughout.

The memory area further stores one or more computer-executable components. Exemplary components include a user interface component. The user interface component 112, when executed by the processor 106 of computing device 102, cause the processor 106 to perform operations, including to receive user selections during user interaction with developer environment 110, for example.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface.

Developer environment 110 provides design tools and a design environment for application design and generation. In some examples, developer environment 110 includes design surface 114, component library 116, code generator 118, and set of policies 120. Design surface 114 may be an interactive canvas or interactive design surface of developer environment 110. In some examples, design surface 114 is part of an interactive graphical user interface displayed on an interactive computing device. For example, design surface 114 may be an interactive surface communicatively coupled to a gesture detection mechanism, such as gesture detection component of a touchscreen, such that gestures detected are used to communicate interaction with the developer environment, or elements of the developer environment.

Component library 116 may include one or more application components or controls, which may be selected or used in application design. In some examples, component library 116 may include hardware elements that represent hardware devices. These hardware elements may be selected and tied to, or wired to, other hardware elements via user interaction with design surface 114. Example hardware elements may include representations of, without limitation, appliances, electronics, vehicles, machines, robotics, furniture, clothing, houseware, office supplies, fixtures, lighting, audio/visual equipment, communication devices, and/or any other suitable hardware device. As used herein, a smart device may refer to any device having communication capabilities, regardless of protocol. As used herein, component may refer to a control, an object, an entity, or any component that may be used in an application or program, whether during design or at runtime.

Component library 116 may be populated in part by detected devices, or smart devices, within range of computing device 102, within a network shared by computing device 102, or otherwise in communication with computing device 102. In some examples, device discovery service 122 may be in communication with computing device 102, providing information about detected devices within a network or range. In other examples, a device discovery mechanism may be implemented as part of developer environment 110. Device discovery may occur on a periodic basis, on an event trigger basis, based on a request, via broadcast, or any other suitable method. For example, a hardware device may come in range of a network and may broadcast a device notification. In another example, device discovery service 122 may scan for available devices on a periodic basis or on some other basis.

Hardware device 124 and hardware device 126 represent two detected hardware devices that may be represented by hardware element 128 and hardware element 130, respectively, in component library 116. In some examples, component library 116 may provide visual representations of components at design surface 114 for selection. User 104 may select hardware element 128 and hardware element 130, representing hardware device 124 and hardware device 126, from component library 116, in order to bind together hardware element 128 and hardware element 130 with a function 132. Function 132 may be an expression with one or more parameters that bind one or more properties of hardware element 130 to hardware element 128. Device capability list 134 provides a selectable list of outputs, of functionality, associated with a selected hardware element representing a hardware device. For example, hardware device 124 may be an oven, represented by a visual icon of an oven as hardware element 128. Selection of the oven icon, such as by a user dragging the oven icon from a visual list in component library 116 onto design surface 114, may trigger device capability list 134 to display outputs of the oven. In this example, device capabilities, or outputs, of a smart oven might be heating, detecting temperature, controlling temperature, timer functionality, digital message display, alerts, and so forth. Device capabilities may refer to any functionality, output, or property of a hardware device. For example, and without limitation, device capabilities may include: audible outputs, tactile outputs, visual outputs, graphical display outputs, sensory outputs, heating functionality, cooling functionality, sensor control, sensor adjustment, sensor detection, automated motion, robotic motion, robotic function, motorized function, propulsion, agitation, vibration, activation, deactivation, immersion, saturation, dehydration, monitoring, communication, recording, audio capture, video capture, multi-media capture, detection, identification, amplification, reduction, translation, rotation, and/or any other suitable function or output.

The terms "hardware device," "hardware component," and "smart device" may be used interchangeably throughout. A smart device may be any type of electronic device that is capable of being connected to a network, service, and/or other devices via protocols (e.g. BLUETOOTH®, ZIGBEE®, 3G, 4G®, LTE®, NFC®, radiowave, transmission control protocol (TCP)/internet protocol (IP), Ethernet, etc.). Examples of smart devices include appliances (refrigerators, microwaves, toasters, televisions, home theater systems, coffee makers, showers, garbage disposals, ovens, garbage cans, dishwashers, doors, mirrors, thermostats, hot water heaters, solar panels, air compressors, doorbells, fans, etc.), security systems, watches, wearable devices, phones, glasses, computers, tablets, lighting, cameras, printers (including 3D printers), furniture, shredders, tethered devices, and any other device capable of being connected to a network. Hardware devices 124, 126 may be smart devices in this example, which are capable of sending and/or receiving input and/or output from other smart devices, as well as receiving input and displaying output to users.

Device capabilities and data transport types, or protocols, may be discovered or otherwise obtained by the authoring environment, such as developer environment 110, during device discovery in some examples. As one example, a device is on-boarded to the authoring environment and provides a metadata file as part of the on-boarding process, the metadata file including device protocols, properties, capabilities, and any other suitable information. This metadata file is then used by the authoring environment when deserializing protocols between two or more devices and generating executable code that chains together the two or more devices in a transformation chain, for example. In other examples, discovered devices may exchange messages with the authoring environment, which may include metadata and/or information about device capabilities and/or supported protocols. In some examples, smart devices may have proprietary communication protocols, while in other examples smart devices may have open or discoverable protocols. Developer environment 110 may obtain device protocol and capability information from proprietary devices using credentials in some examples, or by some other means.

The code generator 118 automatically generates executable code 136 that contains syntax representing hardware elements 128, 130 along with function 132, and any dependencies. As used herein, automatically refers to a process that occurs without user or administrator intervention. In other words, a selection of hardware elements and a selection of one or more properties or functions may be received at design surface 114 and executable code 136 may be generated by code generator 118 using the received data, with no other outside intervention. In some examples, code generator 118 may compile one or more expressions to generate the executable code. Executable code 136 may be pushed to a hardware device for runtime execution, such as hardware device 124, to execute the function 132 biding hardware device 124 and hardware device 126.

Figure 2:
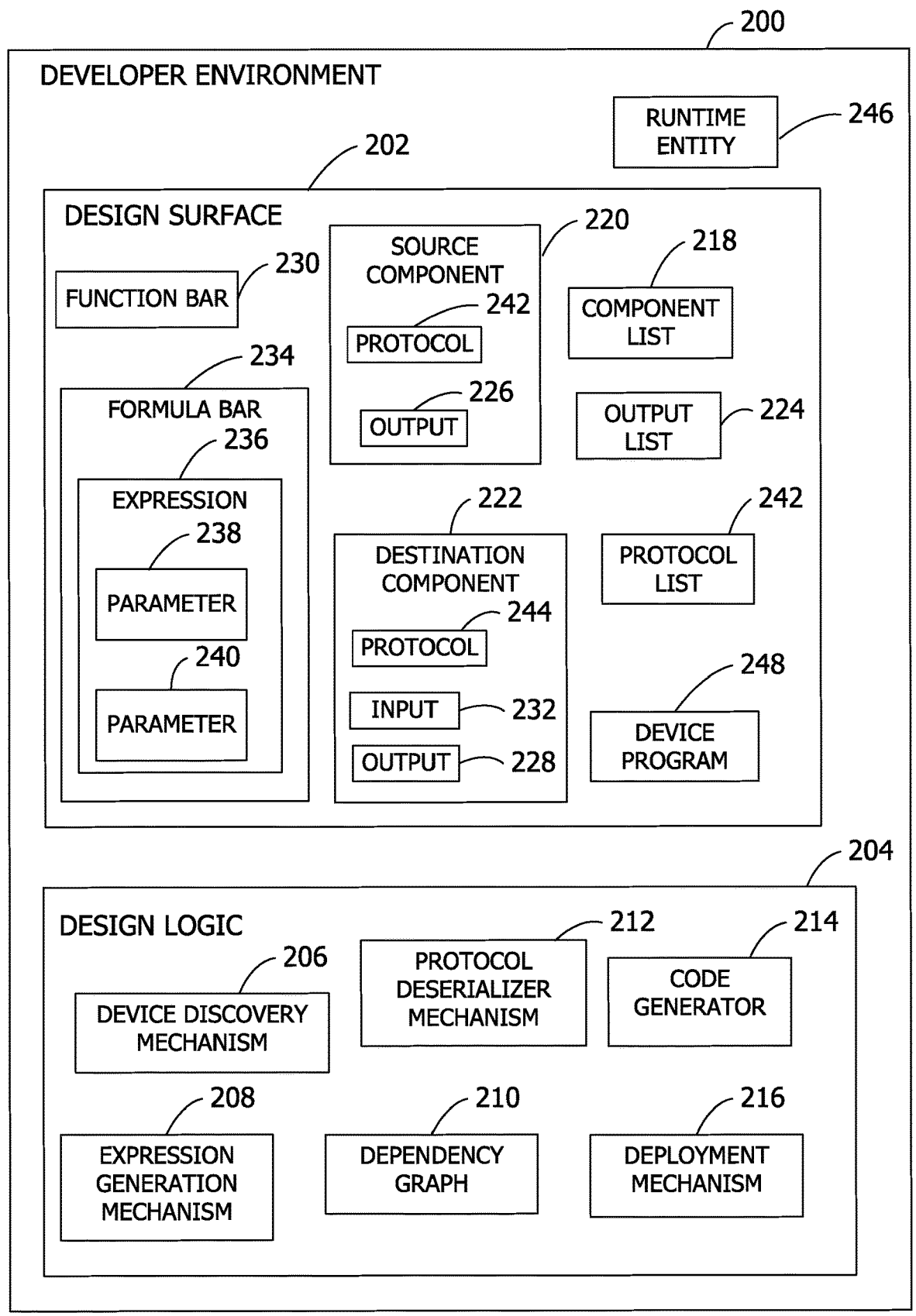
FIG. 2 is an exemplary block diagram illustrating a developer environment for generating an executable program.

FIG. 2 is a block diagram illustrating a developer environment 200 for generating an executable program. Developer environment 200 may be an illustrative example of developer environment 110 in FIG. 1. Developer environment 200 includes design surface 202 and design logic 204.

Design logic 204 includes device discovery mechanism 206, expression generation mechanism 208, dependency graph 210, protocol deserializer mechanism 212, code generator 214, and deployment mechanism 216. Device discovery mechanism 206 may populate at least in part component list 218 at design surface 202 with available or detected devices or components. Component list 218 provides hardware elements, or hardware components, which are visual representations of hardware devices. In some examples, a first selected component or hardware element may be referred to as a source component, and a second selected component may be referred to as a destination component.

Design surface 202 receives an initial selection of source component 220 and destination component 222. The initial selection may be dragging and dropping the source component icon from component list onto a design canvas area of design surface 202, for example. Output list 224 may visually display associated outputs corresponding to device capabilities of the hardware device represented by a component, such as source component 220 or destination component 222. An output may be any type of output capable of being received and/or interpreted by another device, may be digital and/or analog, and may include data, sound, visual indicators, smells, tactile feedback, and/or motion. For example, where source component 220 represents a thermostat, output list 224 may visually display a list of selectable functionality, such as temperature sensor, time indication, timer function, activate air conditioning unit, activate heater element, and so forth. Design surface 202 may receive a selection of an output associated with a selected component from output list 224, such as output 226 for source component 220. Destination component 222 may be selected, which prompts output list 224 to visually display a selectable list of outputs corresponding to device capabilities of the hardware device represented by destination component 222. Output 228 may be selected for destination component 222, and a function may be selected from function bar 230 to connect source component 220 and source component 222, and in particular output 226 and output 228.

A function, such as function 132 in FIG. 1, selected in function bar 230 to connect properties, or outputs, of source component 220 and destination component 222, may tie output 226 to output 228 by providing output 226 as input 232 to destination component 222, such that output 226 of source component 220 is input 232 of destination component 222, which triggers output 228 from destination component 222. In other words, source component 220 and destination component 222 represent hardware nodes in a transformation chain that takes as input the output of one hardware device and creates output from another hardware device that receives the input. An input, as used herein, provides input functionality for receiving, computing, interpreting, and/or analyzing the output of another smart device.

Expression generation mechanism 208 automatically generates code based on the received components and/or output selections. Expression generation mechanism 208 may also update dependency graph 210 with the dependencies between components and properties of components based on the automatically generated code. Formula bar 234 visually exposes the automatically generated code corresponding to the binding of components, and properties of components. For example, formula bar 234 may display expression 236, which includes parameter 238 and parameter 240. Parameter 238 may correspond to output 226 and parameter 240 may correspond to input 232 and output 228, for example. Formula bar 234 may also provide for user interaction to modify an automatically generated parameter or expression, in some examples.

An expression may be a function, or may contain multiple functions, which in turn may contain multiple parameters. For example, the formula bar 234 provides an expression 236 that may bind a time output from one device as input to trigger a heating output from another device, where parameter 238 pertains to the time, and parameter 240 pertains to the preconfigured temperature that is to be reached by a heating element of the other device. Any number of parameters may be utilized, and may receive data from users, hardware elements, computers, etc. The expression may be parameterized, and/or may be based on underlying code associated with one or more hardware elements. While the parameters and the expression itself may be derived from underlying code, the expression may also utilizes values stored within the parameters themselves. The expression, such as expression 236, may be protocol agnostic with regard to the one or more hardware elements tied to the expression via parameters.

Protocol list 242 provides a list of supported communication protocols for developer environment 200. In some examples, selection of a component, such as source component 220 or destination component 222, may optionally visually expose protocol(s) compatible with or otherwise supported by the hardware device represented by that component. In other examples, protocol 242 for source component 220 and protocol 244 for destination component 222 may be recognized by protocol deserializer mechanism 212, which may use protocol 242 and protocol 244 to generate runtime entity 246 that provides communication and/or interpretation between protocol 242 and protocol 244. Deserialization provides a way for both technical and non-technical users alike to achieve interoperability among smart devices, including smart devices that may typically not be able to communicate with each other. For instance, deserializer mechanism 212 generates a runtime entity and incorporates a declared data transport type associated with a hardware element (also known as a hardware node) into the runtime entity as part of the generated executable code.

Hardware elements, such as source component 220 and destination component 222 in the illustrative example of FIG. 2, are on-boarded to the authoring environment, such as developer environment 200, in order to provide selectable hardware elements at component list 218. At the time a hardware element is on-boarded, or added to component list 218, device metadata accompanying the hardware element is provided to or obtained by design logic 204. The device metadata may include, without limitation, input properties of the device represented by the hardware element, output properties of the device, supported protocol(s) of the device, and any other suitable device information associated with the hardware device represented by the hardware element. Runtime entity 246 uses this device metadata obtained by design logic 204 to support execution of expression 236 at runtime. In an illustrative example, protocol deserializer mechanism 212 identifies protocol 242 and protocol 244 as the protocols to deserialize for expression 236 based on the device metadata associated with source component 220 and destination component 222 provided or obtained at the on-boarding of these components to the authoring environment, or at the addition of these components to component list 218. As another example, protocol deserializer mechanism 212 is driven by the device metadata associated with the hardware elements, or components, and based on the device metadata deserializes the device protocols into runtime entity 246.

Code generator 214 compiles expression 236 and runtime entity 246 into executable code, such as device program 248, based at least in part on dependency graph 210. Dependency graph 210 provides a graphical and/or code-based representation of the relations among smart devices within a device chain. The chaining of smart devices creates dependencies so that modification of part of the device chain (such as one or more hardware elements) propagates changes along the device chain, wherein the smart device chain and/or code is reconfigured, recompiled, and/or recalculated. When represented graphically, for example, the dependency graph 210 provides a high-level view of how changes (or proposed changes) affect the hardware elements in the device chain. For example, a thermostat, when reading a certain temperature, may trigger an air conditioning compressor to activate, which may in turn trigger a television to turn on (or change to a specified channel). Removing the air compressor may disrupt the functionality of the television, although in some examples the device chain may be self-correcting such that parameters are automatically applied to devices further down the device chain. A notification may be generated when removing a hardware element, which may be displayed at design surface 202 in some examples. Adding a hardware element may be done at any suitable point in the dependency chain. However, this may involve additional modification in terms of output(s) being received at the additional hardware element, and input(s) being sent from the additional hardware element. Some examples also provide a confirmation prompt before permitting dependency changes.

Code generator 214 may generate device program 248 based on a function call selected at function bar 230 to connect selected components, for example. Deployment mechanism 216 may deploy device program 248 as executable code to one or more destinations, such as to a hardware device or to the cloud, or both. Deployment mechanism 216 allows device chains, as device program 248, to be uploaded, downloaded, saved, exported, imported, and shared. Any suitable file type (including an application or "app") may be utilized, and the data in the file may include, for example, the hardware elements 220, 222 representing smart devices and associated functionality (including output 226, input 232 and output 228), device protocols 226, 228, dependency graph(s) 210, and associated code and expression(s), such as expression 236 and parameters 238, 240. This allows users having the same (or similar) smart devices to send and receive files that provide customized functionality between smart devices. For example, if UserA creates a device chain between an alarm clock and a television, UserA can send the device chain, as device program 248, to UserB to enjoy similar customized functionality. Moreover, UserB may then be able to modify parameters (e.g., alarm time for the alarm clock) within the formula bar 234 in order to change the alarm time to suit the preferences of UserB. Some examples also provide for parameters that relate to other users, such as the alarm clock and/or device chain of UserB inheriting the updated alarm time of the alarm clock and/or device chain of UserA in real-time and/or based on periodic updating. In some examples, a user creates a device chain that may be applied to types of devices instead being particular to specific brands/models of devices or device protocols. For example, the output of a thermostat control for an oven may be saved as a published device chain file, wherein another user can download the device chain to have their thermostat control their oven in the same way. In this example, the device chain illustratively refers to thermostats and ovens, but is not limited to any particular type of device.

Figure 3:
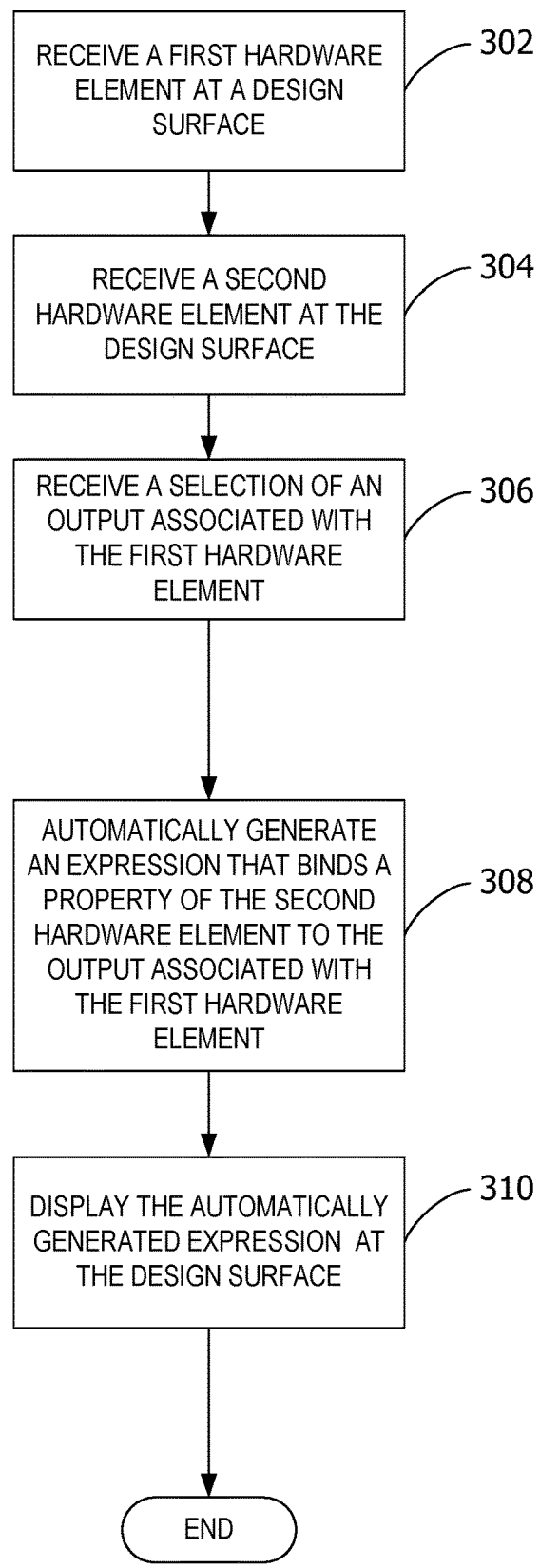
FIG. 3 is an exemplary flow chart illustrating operation of the computing device to generate an expression to be displayed at a design surface.

FIG. 3 is an exemplary flow chart illustrating operation of the computing device to generate an expression to be displayed at the design surface. The computing device receives a first hardware element at a design surface at operation 302. For example, a smart oven is selected at the design interface, such as by a user dragging and dropping an oven icon onto a design canvas of the design interface. The computing device receives a second hardware element at the design surface at operation 304. Continuing with this example, a smart television is selected as the second device. The computing device receives a selection of an output associated with the first hardware element at operation 306. For example, the selected output may be a pre-heating sensor on the oven. The computing device automatically generates an expression that binds a property of the second hardware element to the output associated with the first hardware element at operation 308. The computing device displays the automatically generated expression at the design surface at operation 310, with the process terminating thereafter. This may include displaying editable parameters in the expression, along with editable parameter values. Continuing with the above example, the generated expression has a temperature parameter that receives temperature data from the oven sensor, which is bound as input to the smart television at the design surface.

Figure 4:
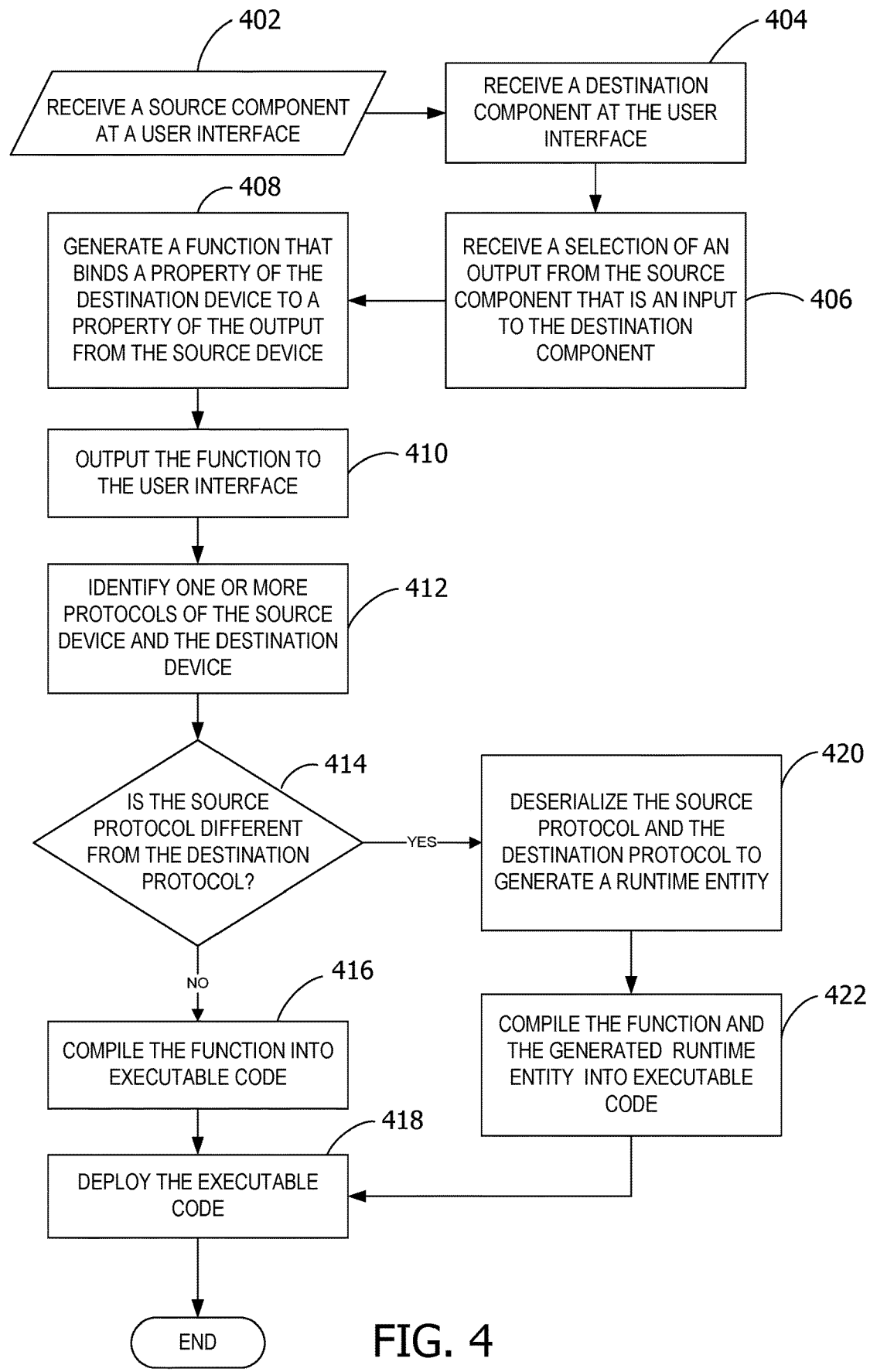
FIG. 4 is an exemplary flow chart illustrating operation of the computing device to generate executable code that binds two devices.

FIG. 4 is an exemplary flow chart illustrating operation of the computing device to generate executable code that binds two devices. The process beings with the computing device receiving a source component at a user interface at operation 402. The computing device receives a destination component at the user interface at operation 404. The source component and the destination component may represent two different hardware devices, for example. The computing device receives a selection of an output from the source component that is an input to the destination component at operation 406. The computing device generates a function that binds a property of the destination device to a property of the output from the source device at operation 408. The computing device outputs the function to the user interface at operation 410.

The computing device then identifies one or more protocols of the source device and the destination device at operation 412. In some examples, the selected hardware elements may represent two different hardware devices, each with different protocols. For example, a smart thermostat that supports ZigBee® may be one device represented by a source component, and a smart window shade that supports Bluetooth® may be another device represented by a destination component.

The computing device determines if the source protocol (associated with the source component) is different from the destination protocol (associated with the destination component) at operation 414. If the computing device determines that the protocols do not differ, the computing device compiles the function into executable code at operation 416 and deploys the executable code at operation 418.

If the computing device determines that the protocols differ, the computing device deserializes the source protocol and the destination protocol to generate a runtime entity at operation 420. The generated runtime entity enables communication between different types of devices with different protocols. The computing device then compiles the function and the generated runtime entity into executable code at operation 422, then deploys the executable code.

FIGS. 5A-5E are exemplary user interface illustrations for generating executable programs to binding together hardware devices. Any interface elements may be displayed in any manner, and need not resemble those illustrated in FIGS. 5A-5E.

Figure 5A:
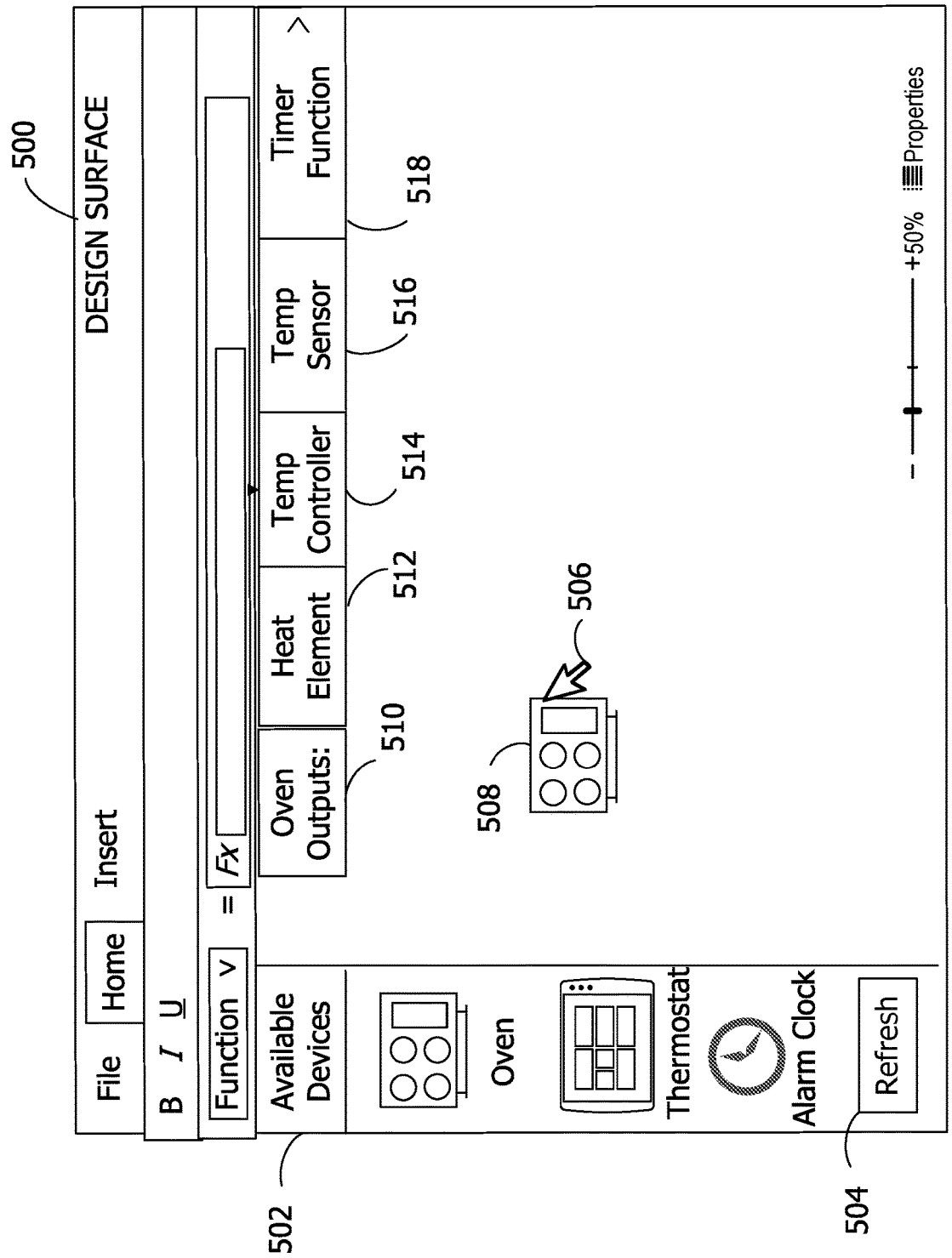
FIG. 5A-5E are exemplary block diagrams illustrating a user interface for generating executable code to bind hardware devices.

Design surface 500 may be an illustrative example of design surface 202 in FIG. 2. Referring to FIG. 5A, a listing of available devices 502 may be displayed based upon devices that are available for selection to include in a device chain. Any suitable type of display, including 3D and/or holographic, may be utilized. Available devices 502 may be refreshed or updated using refresh 504, which may be a user-selectable option, or may be updated periodically, or on some other basis, such as receiving a device notification from a device that comes into range of a discovery service, in some examples. In other examples, the listing of available devices 502 may be automatically refreshed/updated periodically, in real-time, near real-time, or based upon a specified basis. The listing of available devices 502 may be filtered by any criteria, such as proximity, protocols/networks, device type, etc. Selection 506 may select a first hardware element, such as oven 508. In this example, oven 508 may be a hardware element representing a smart oven device. Selection 506 may be from an input device, such as cursor controlled by a peripheral device, or any other type of input (e.g., touch screen, gestures, voice, eye movement/blink), for example. Upon selection of oven 508, oven capabilities associated with the smart oven device that is represented by oven 508 are displayed as oven outputs 510. For example, oven outputs may include, without limitation, heat element 512, temperature controller 514, temperature sensor 516, and timer function 518.

Figure 5B:
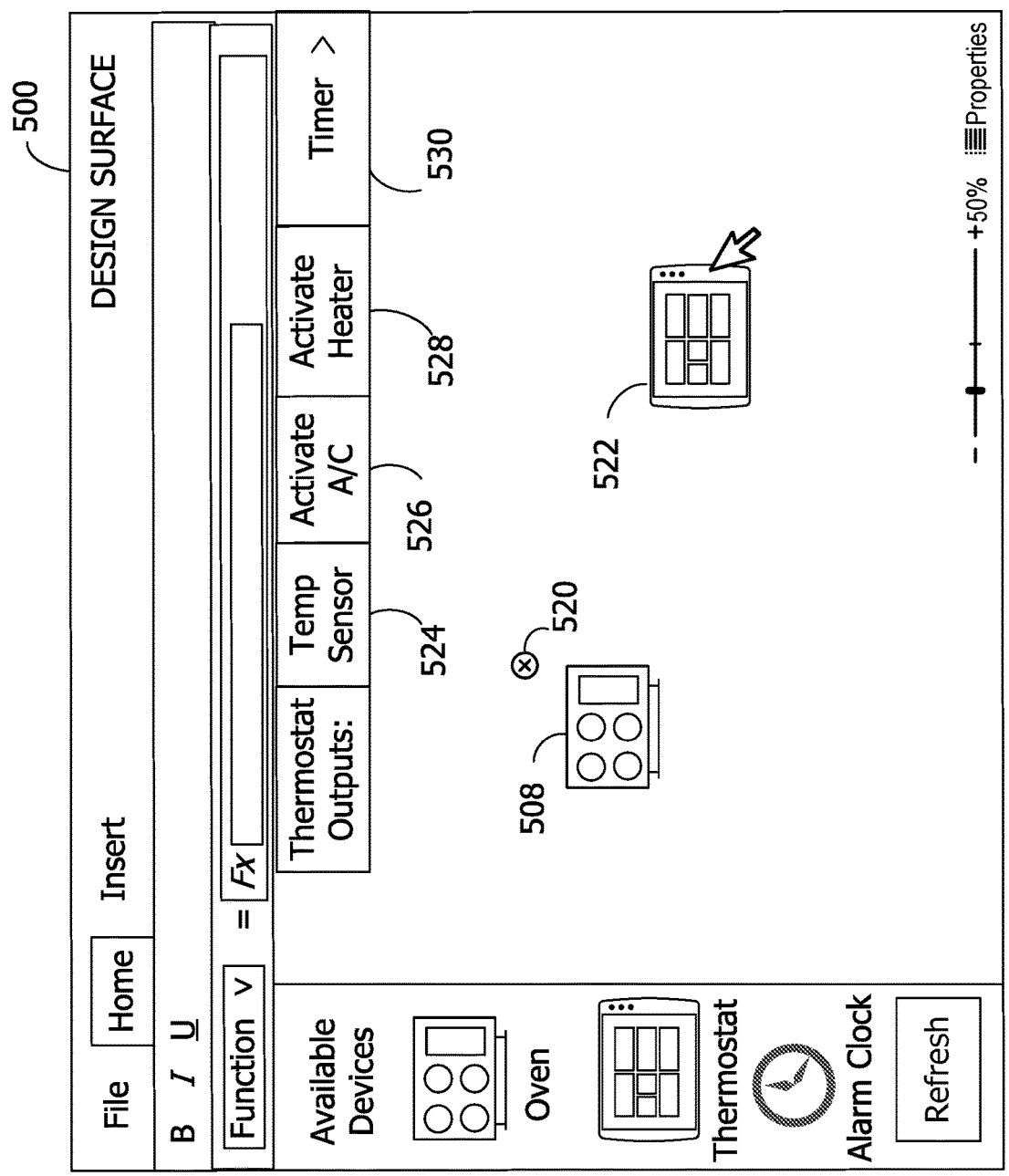

Referring to FIG. 5B, design surface 500 illustrates a selection of a second hardware element, which provides a visual indication that oven 508 is not currently the focus of the user interface interaction, such as by providing a delete selector 520 adjacent to oven 508. This visual indication may be provided in any manner, such as by providing a highlight or border box around the element that is currently selected or subject to modification, for example. Delete selector 520 may also be provided in addition to another visual indicator, in order to provide for efficient user interaction to remove a hardware element from a design canvas area of design surface 500, in other examples.

In this illustration, a thermostat 522 has been selected as a second hardware element, representing a smart thermostat device. The thermostat outputs displayed may include temperature sensor 524, activating an air conditioning unit 526, activating a heater 528, and a timer 530. Note that the protocols associated with oven 508 and thermostat 522 need not be displayed, as the design logic will recognize the protocols supported and provide the runtime entity for the executable code to enable communication between the two different hardware devices represented by these hardware elements. In this way, a user may chain different types of devices together regardless of protocol, creating a program that connects smart devices that may not necessarily be pre-programmed to communicate with each other.

Figure 5C:
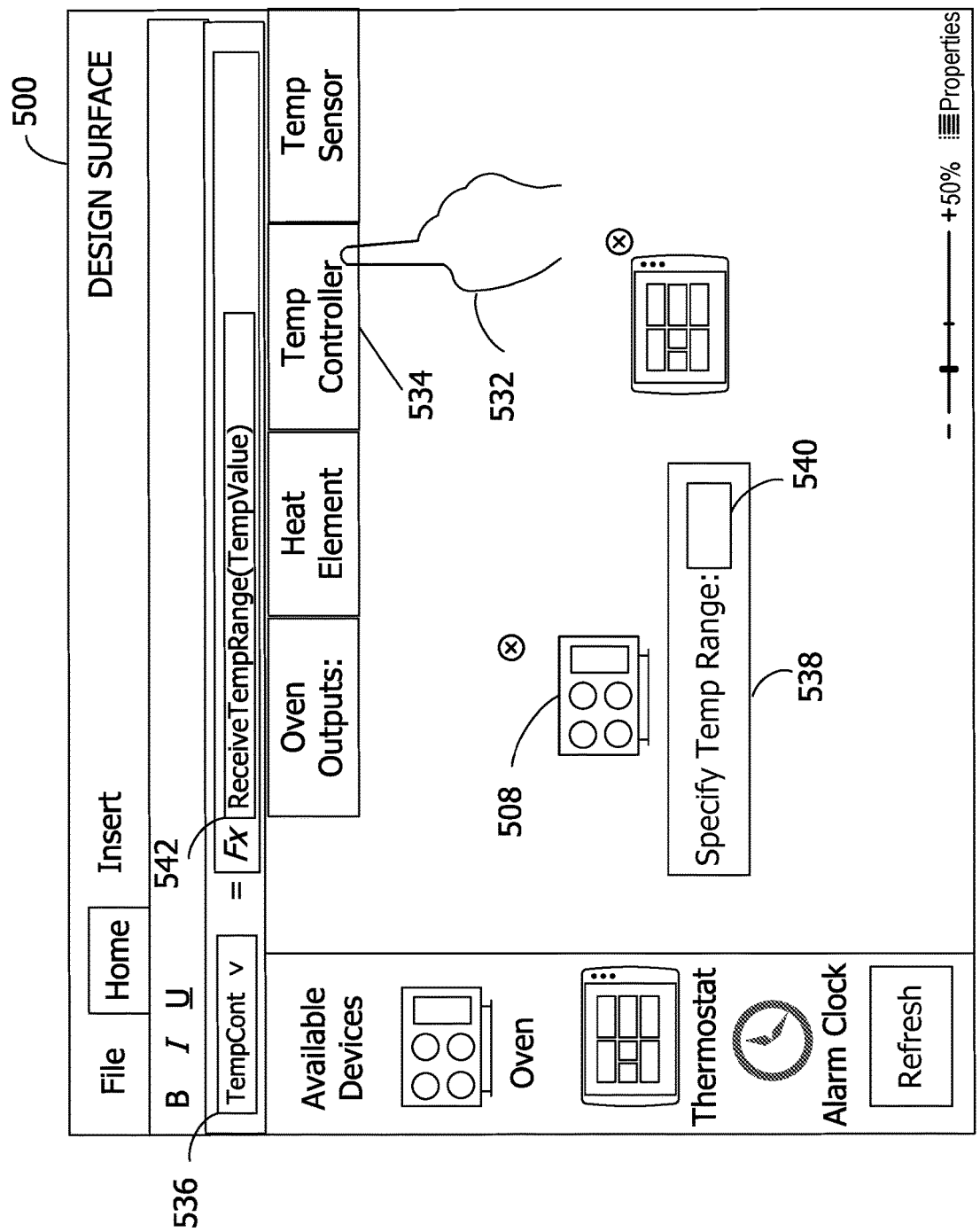

Referring to FIG. 5C, design surface 500 depicts a mode where a user has selected oven 508, as the source component, to view available outputs or properties that may be used as input to thermostat 522, the destination component. User selection 532 here selects temperature controller 534 as the output of oven 508 to customize as the input for the destination component. Selection of an output for customization visually exposes the function that is being generated and/or modified at function bar 536, and may also provide an input field or dialogue box at design surface 500, such as dialogue box 538 with input field 540. In this example, dialogue box 538 has an input prompt "specify temperature range" to guide a user towards the type of value to input at input field 540. Any type of input entry may be utilized, (text, drop-down list, radio button, etc.) along with any type of data format and/or data-type. In addition, a drop-down list of functions may be provided at function bar 536 to select from among the functions available to the currently selected hardware element.

Expression bar 542 displays the expression as it is automatically generated based on the user selections at design surface 500. The expression may include one or more parameters, including values selected. This visually exposes the code or pseudo-code being generated by design logic to a user, and may also provide for additional modification where a user desires to modify the expression or parameters of the expression within the expression bar 542, in some examples. In the example depicted, a current expression "ReceiveTempRange" utilizes parameter "TempValue" which does not yet contain a value, but will reflect the value input into input field 540.

Figure 5D:
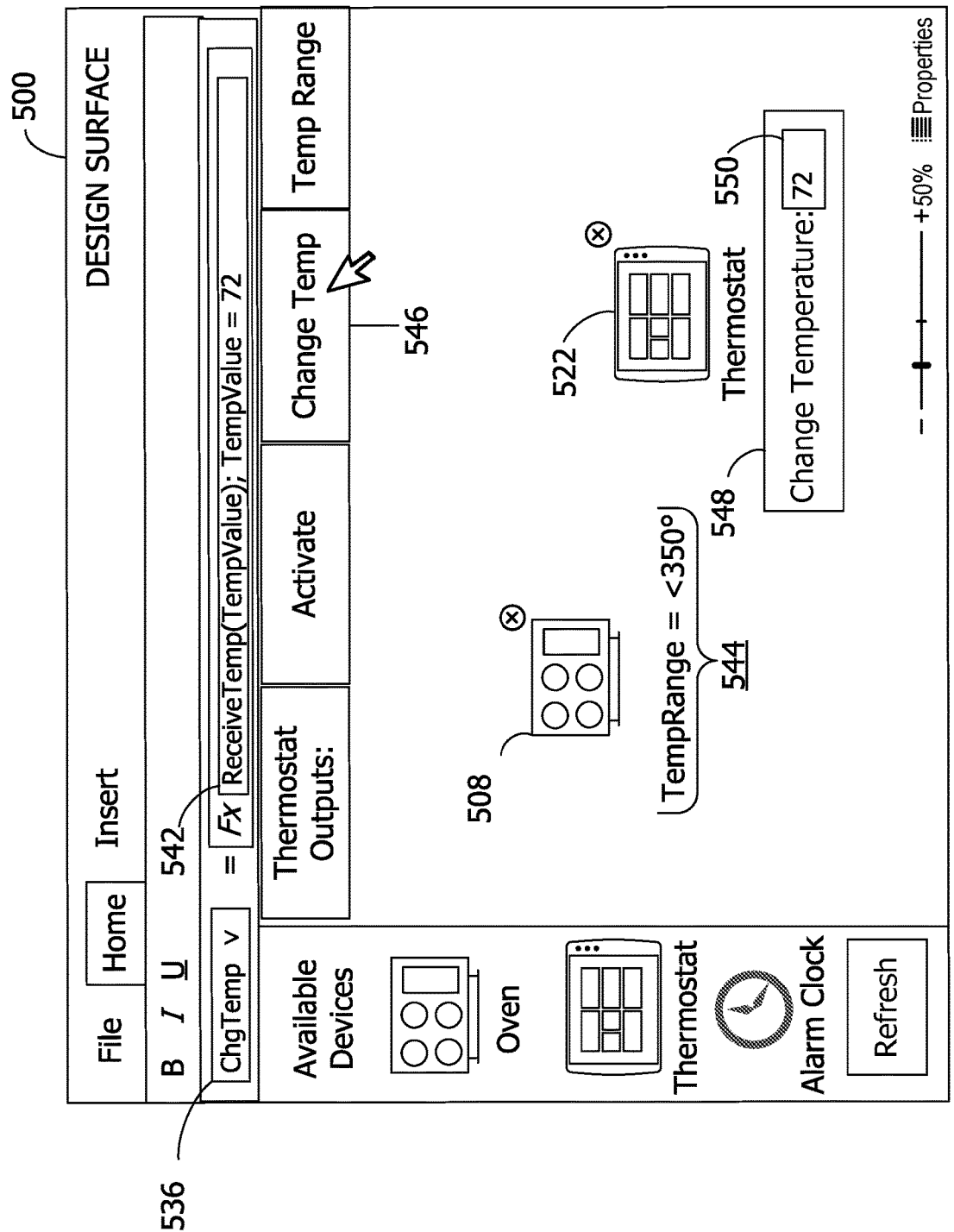

Referring to FIG. 5D, design surface 500 depicts a mode where a user has selected thermostat 522 as the destination component, which receives as input the selected output of the source component, oven 508 in this example. Output 544 is displayed adjacent to oven 508 in this example, showing a customized temperature range of <350° as the output of oven 508 to use as input to thermostat 522. For example, a smart oven represented by oven 508 may be programmed or set to 350°, or otherwise reach that temperature, which may trigger the smart oven to send a message to thermostat 522.

The selection of thermostat 522 as a destination component displays associated outputs for selection. In this example, change temperature 546 has been selected as an output of thermostat 522 that is changed based on output 544 from oven 508 received as input to thermostat 522. Selection of a property or output of the destination component displays the selected function at function bar 536, and provides dialogue box 548 with input field 550 to guide a user through customization of the desired output. Here the dialogue box 548 has a prompt "change temperature" to guide a user to a suitable value for input into input field 550. Expression bar 542 visually displays the addition or modification to the automatically generated expression based on selection of a property of the destination component to bind to the output of the source component.

Figure 5E:
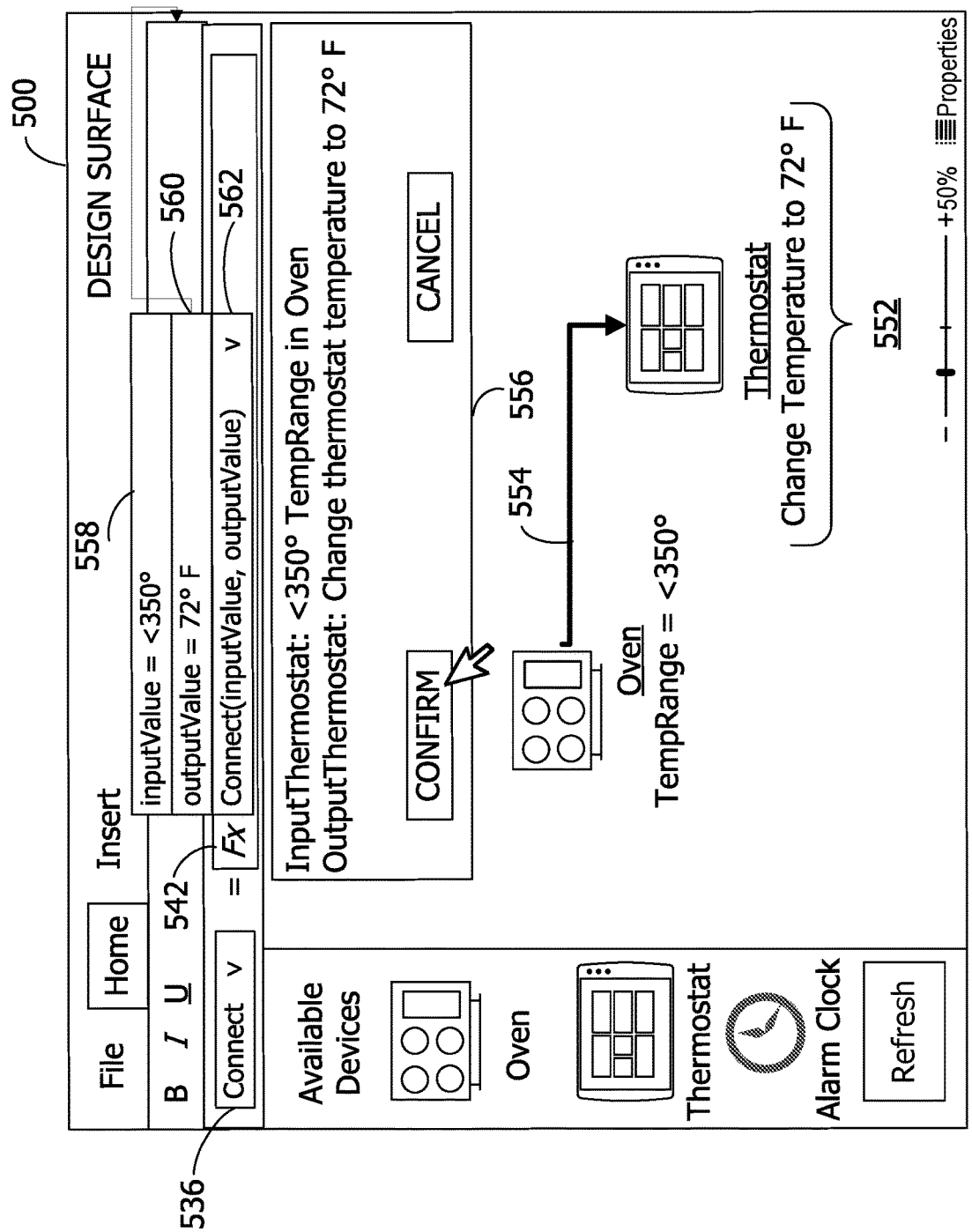

Referring to FIG. 5E, design surface 500 depicts a mode where a selection of a connect function has been made at function bar 536, to bind the selected hardware elements, and the selected properties or outputs of the hardware elements, to perform the desired output.

In this example, a graphical representation of output 552 for thermostat 522 is displayed, change temperature to 72. In some examples, the type of temperature (Fahrenheit, Celsius, Kelvin, etc.) may be specified/selected for the numeric temperature parameter value. A graphical connection indicator 554, for example depicted here as an automatically generated arrow, represents a potential device chain. Any number of devices may be chained together. A hardware element may receive multiple inputs and/or send multiple outputs to another hardware element or a plurality of other hardware elements. Device chaining is not restricted to sequential chaining of devices. In some examples, the graphical connection indication may be drawn by the user, with or without software-aided drawing assistance. In addition, a deletion mechanism may be provided to remove the graphical connection indicator 554, wherein the deletion mechanism can utilize any type of interface, and may not be utilized in some examples. A confirmation prompt 556 may be used to solicit user confirmation that the current device chain is what is intended. The confirmation prompt here displays the contents of the parameters, but need not in other examples. Upon receiving a selection of the "confirm" option, for example, the device chain is created by a code generator generating executable code. The function bar 536 reflects a connection function. This is also reflected in the expression bar 542, which displays in a first expression panel 562 the "Connect" function utilizing parameters "inputValue" and "outputValue." A second expression panel 560 displays parameter "outputValue" containing a value of "72° F." A third expression panel 558 displays parameter "inputValue" containing a value of "<350°." In some examples, the contents of the formula bar, or the expression panels, may modified by the user, such as to change a value or modify a parameter. In other examples modification of parameters or aspects of the expression may be restricted by design logic to changes or values that are compatible with the selected hardware elements and/or properties.

The device chain, compiled as executable code, may be saved, downloaded, uploaded, and/or shared with others. Chain files may be time-limited, sold, and/or rented, depending on permissions/restrictions set forth by chain file creators, subsequent users, smart device manufacturers, third parties, etc. Additionally, chain files may have security features (passwords, biometrics, etc.) and/or be associated with user profiles. Additionally, one or more smart devices may have template and/or master profiles that provide built-in function templates that can be further modified by users. Moreover, a user can save some or all of their device chains together as a bundle, which can also be protected by any type of security measure(s). In some examples, code and/or updates can also be pushed to smart devices and/or hardware elements, such as from the cloud, other devices, manufacturers, etc.

Figure 6A:
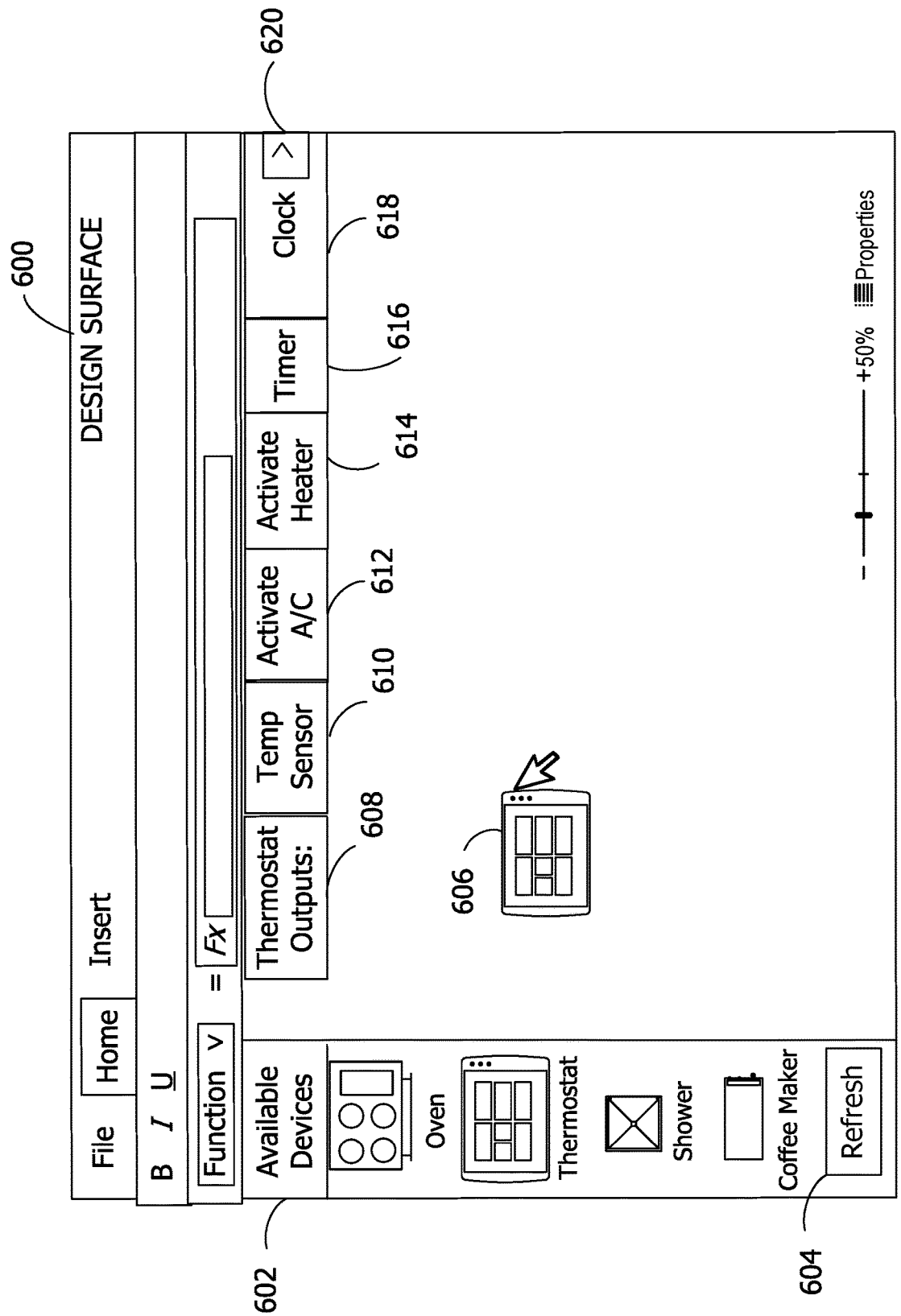
FIG. 6A-6G are exemplary block diagrams illustrating connecting devices via executable code.

Referring now to FIG. 6A, design surface 600 depicts an illustrative example of available devices 602 after a refresh 604 option has been selected. Additional devices may be discovered or identified as available smart devices for inclusion in a device chain, for example. Selection of a first hardware element, or source component, may be made by selecting a graphical representation of a hardware device from the available device list. In this example, thermostat 606 has been selected and placed at a design canvas area of design surface 600. Thermostat 606 is a graphical representation of a thermostat device, which may be a smart thermostat. Thermostat outputs 608 display device capabilities of the hardware device represented by thermostat 606. In this example, outputs may include temperature sensor 610, activate air conditioning 612, activate heater 614, timer 616, and clock 618. Additional outputs may be available for selection. In addition, while a graphical bar of selection buttons is depicted, a drop down list or any other graphical presentation of selectable options may be used. Here, button 620 represents a visual indication that additional outputs are available for selection and may be viewed by scrolling over in this exemplary visual display.

Figure 6B:
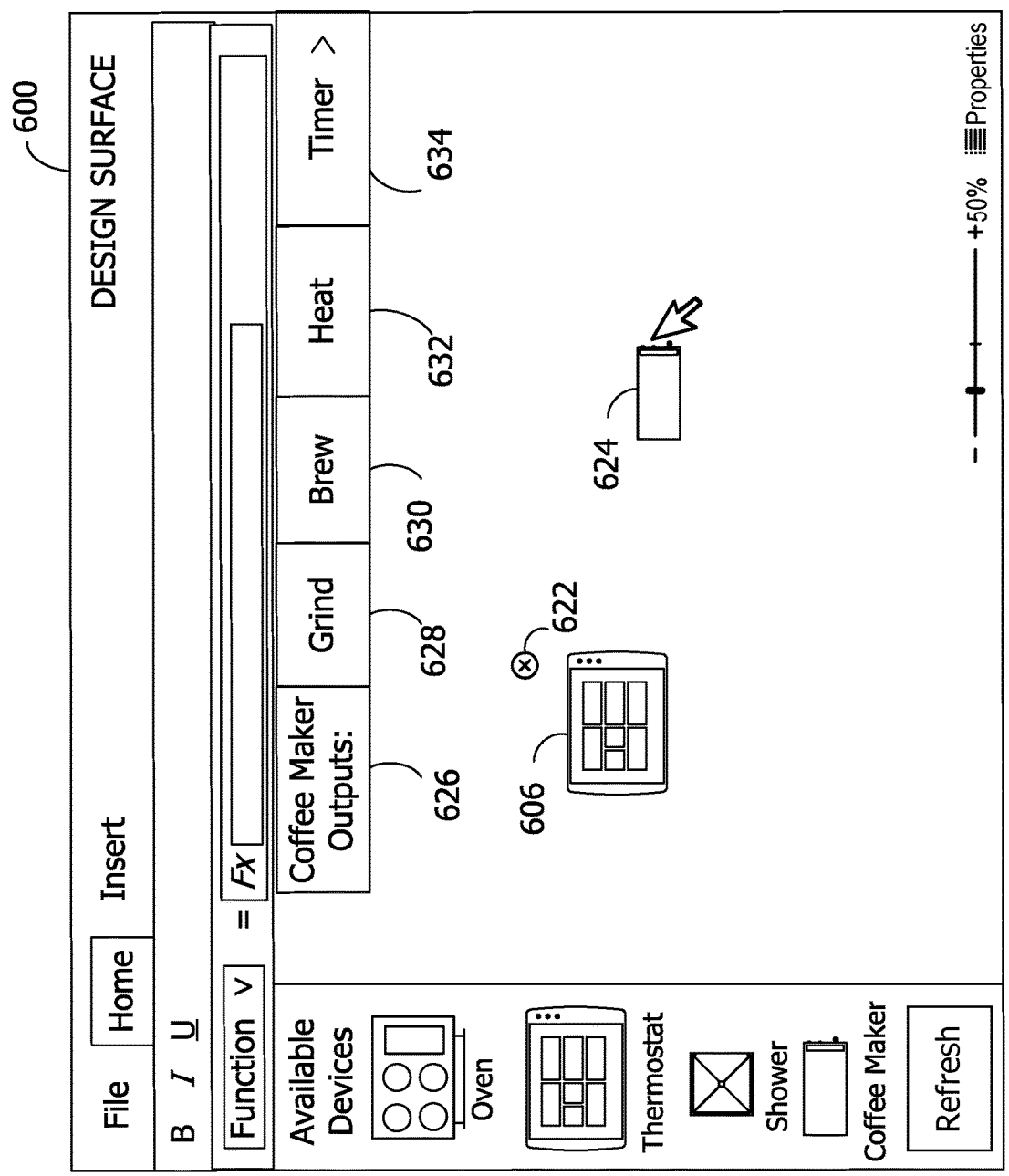

Referring to FIG. 6B, design surface 600 represents a mode where a user has selected a second hardware element, or destination component. Selection of another hardware element may display a delete option 622 adjacent to the first hardware element, or previous hardware element. In addition, a first hardware element may be selected as the destination component, with a second hardware element selected as the source component, in other examples.

Coffee maker 624 is selected as the destination component in this illustration. Coffee maker outputs 626 are displayed adjacent to the formula bar in this example, with available outputs associated with device capabilities of a smart coffee maker represented by the graphical element of coffee maker 624. Example outputs include grind 628, brew 630, heat 632, and timer 634.

Figure 6C:
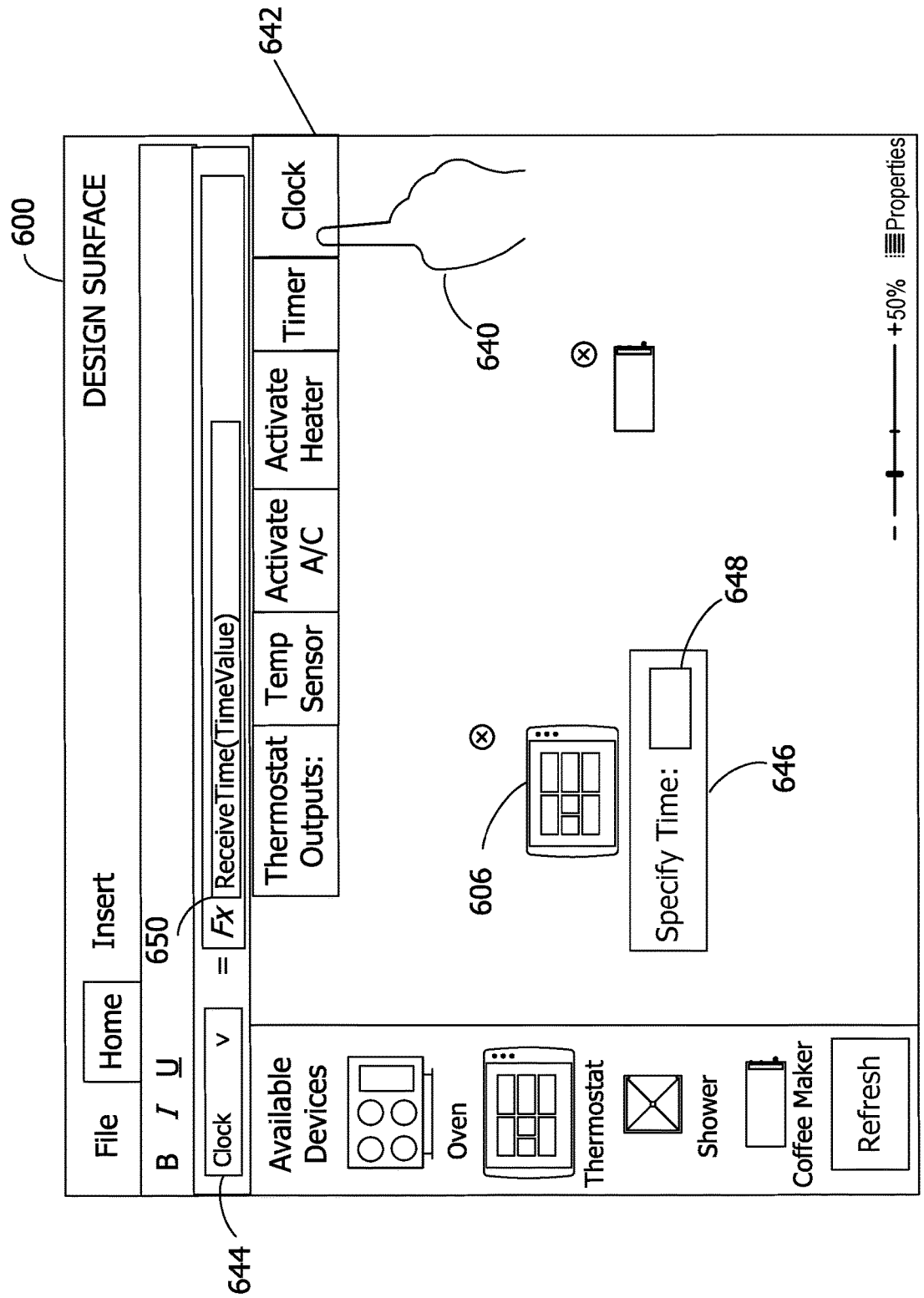

Referring to FIG. 6C, selection of thermostat 606 as the source component displays outputs associated with the device represented by thermostat 606. Selection 640 of clock 642 may expose the selected function at function bar 644, visually providing an indication to the user of the function a user selection has invoked for modification or customization. A dialogue box 646 may be provided with input field 648 to capture the desired value associated with the selected function in order to automatically generate a parameter for an expression, which will be displayed at formula bar 650.

Figure 6D:
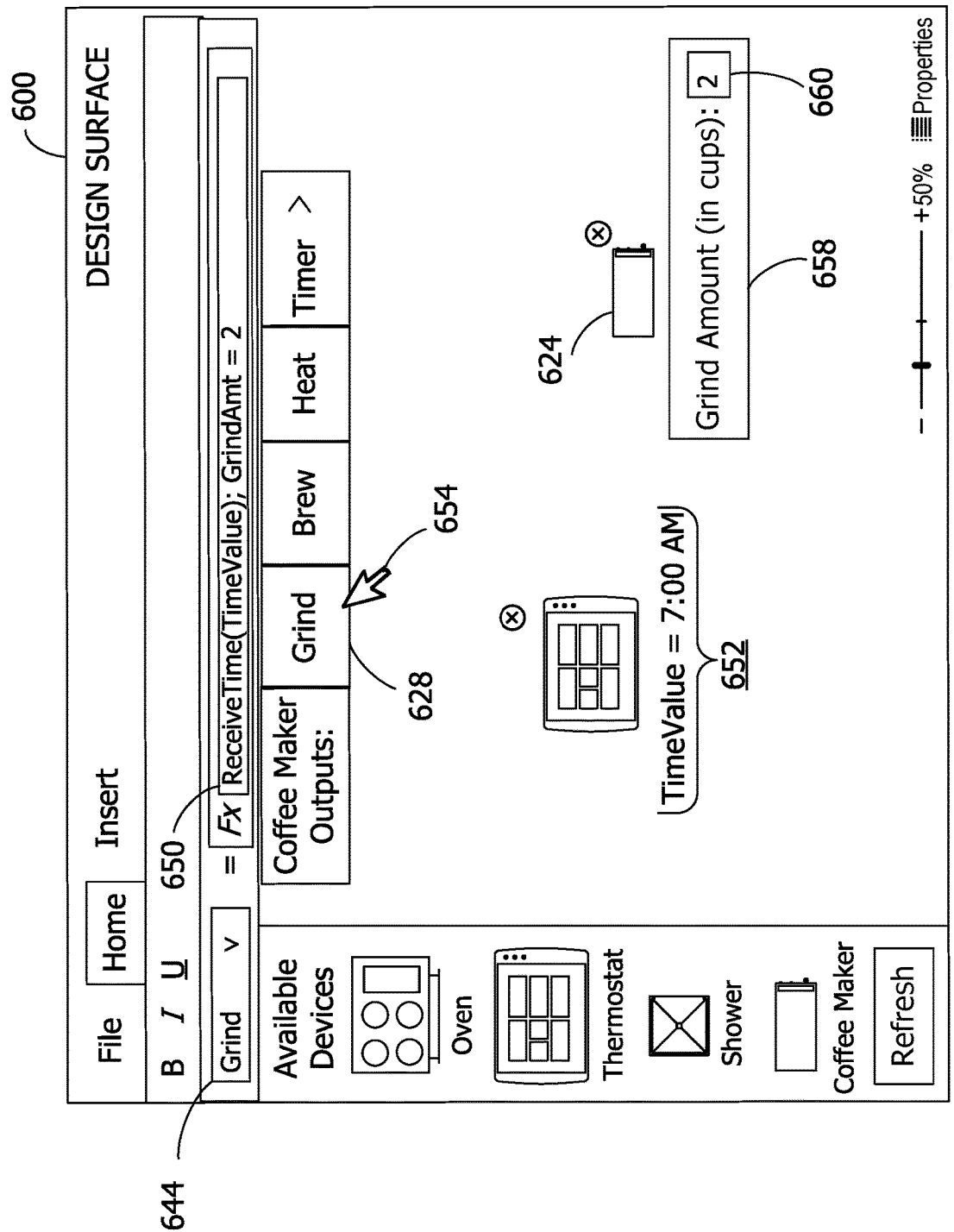

Referring to FIG. 6D, selection of coffee maker 624 as a destination component moves into a mode to customize the output of a coffee maker that may be affected or changed based on the output of the thermostat. Here, the customized output 652 that will be used as input to the destination component may be displayed at design surface 600. Selection 654 of a grind function 656 may provide a parameter for customization, such as via dialogue box 658 and input field 660. A user prompt, "Grind Amount (in cups):" may guide a user to a type of data or type of value that is compatible with the function selected. The expression being generated based on user selection is displayed at formula bar 650.

Figure 6E:
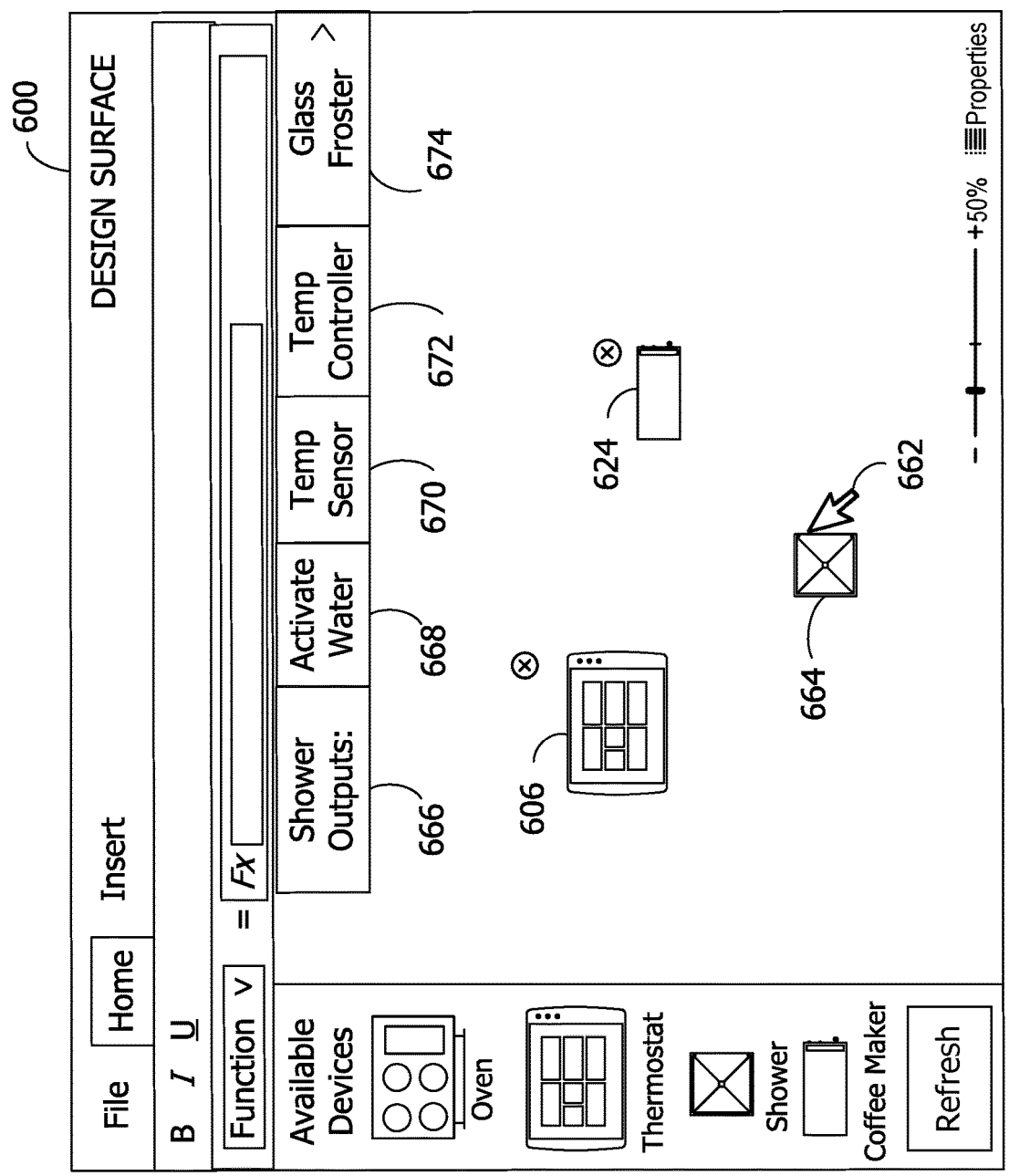

Referring to FIG. 6E, a third hardware element may be selected to add to the device chain being created. In this example, selection 662 of shower 664 adds a third hardware element to the selected elements for chaining. Shower 664 represents a smart shower, such as a shower having capabilities to automatically activate water pressure, adjust for water temperature, change a visibility of a glass enclosure, or any other possible automation. Selection of shower 664 displays shower outputs 666, which in this example may include: activate water 668, temperature sensor 670, temperature controller 672, and glass froster 674.

Figure 6F:
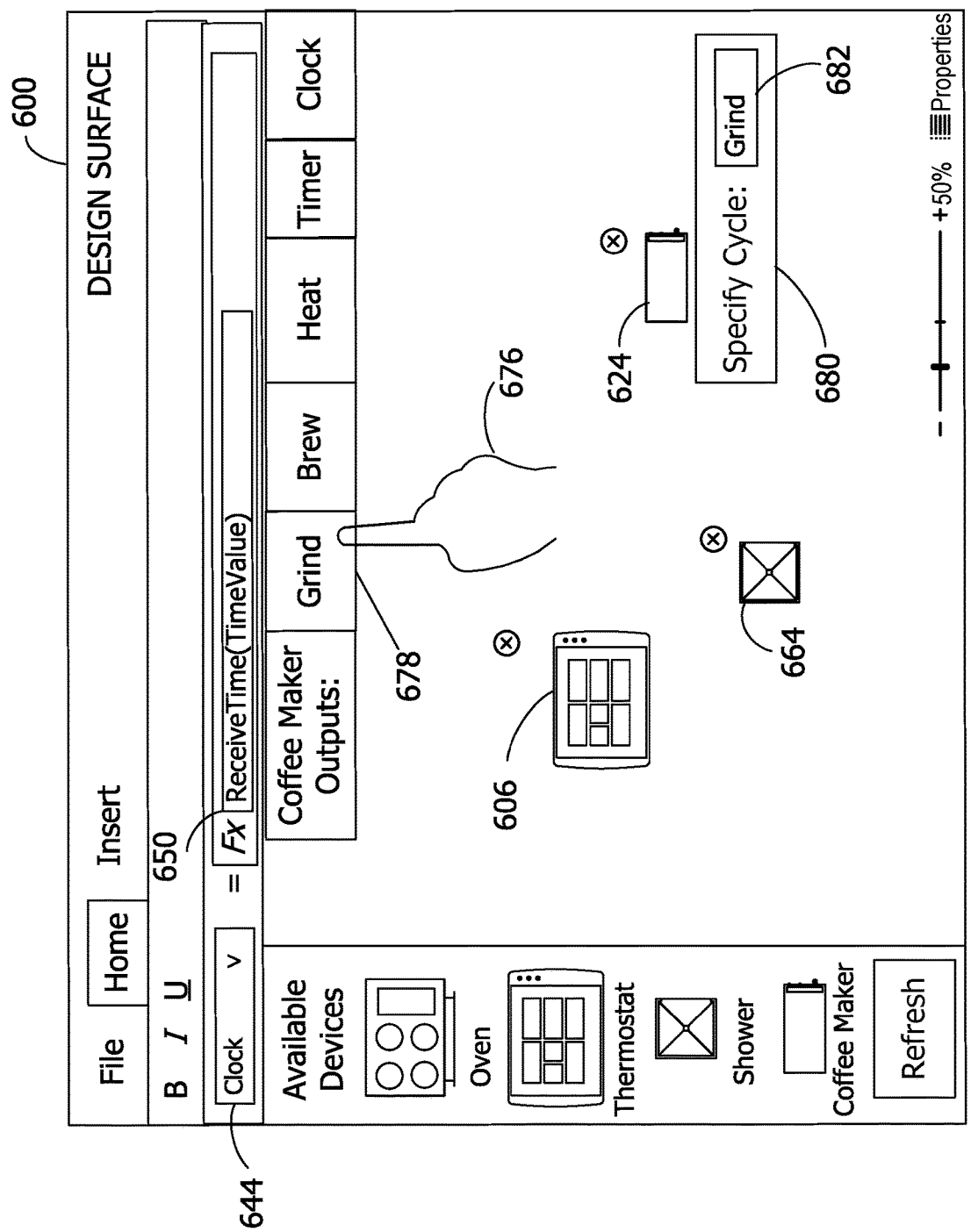

Referring to FIG. 6F, a selection of coffee maker 624 displays associated outputs, which may be used as inputs for shower 664. In this example, thermostat 606 is the source component to coffee maker 624 as the destination component, while coffee maker 624 may be the source component to shower 664 as the destination component. In other words, there may be more than one source component and/or more than one destination component in a single device chain. In this example, selection 676 of grind 678 as an output of coffee maker 624 provides for customization of the output via dialogue box 680 and input field 682. Here, design logic may infer that a cycle of a coffee maker device is desired as the input for a destination component. In this example, a smart thermostat recognizes a time, which triggers a smart coffee maker to begin grinding beans for a two cup brew, which in turn triggers a smart shower to activate water to a customized temperature and even fog a glass enclosure to reduce visibility.

Figure 6G:
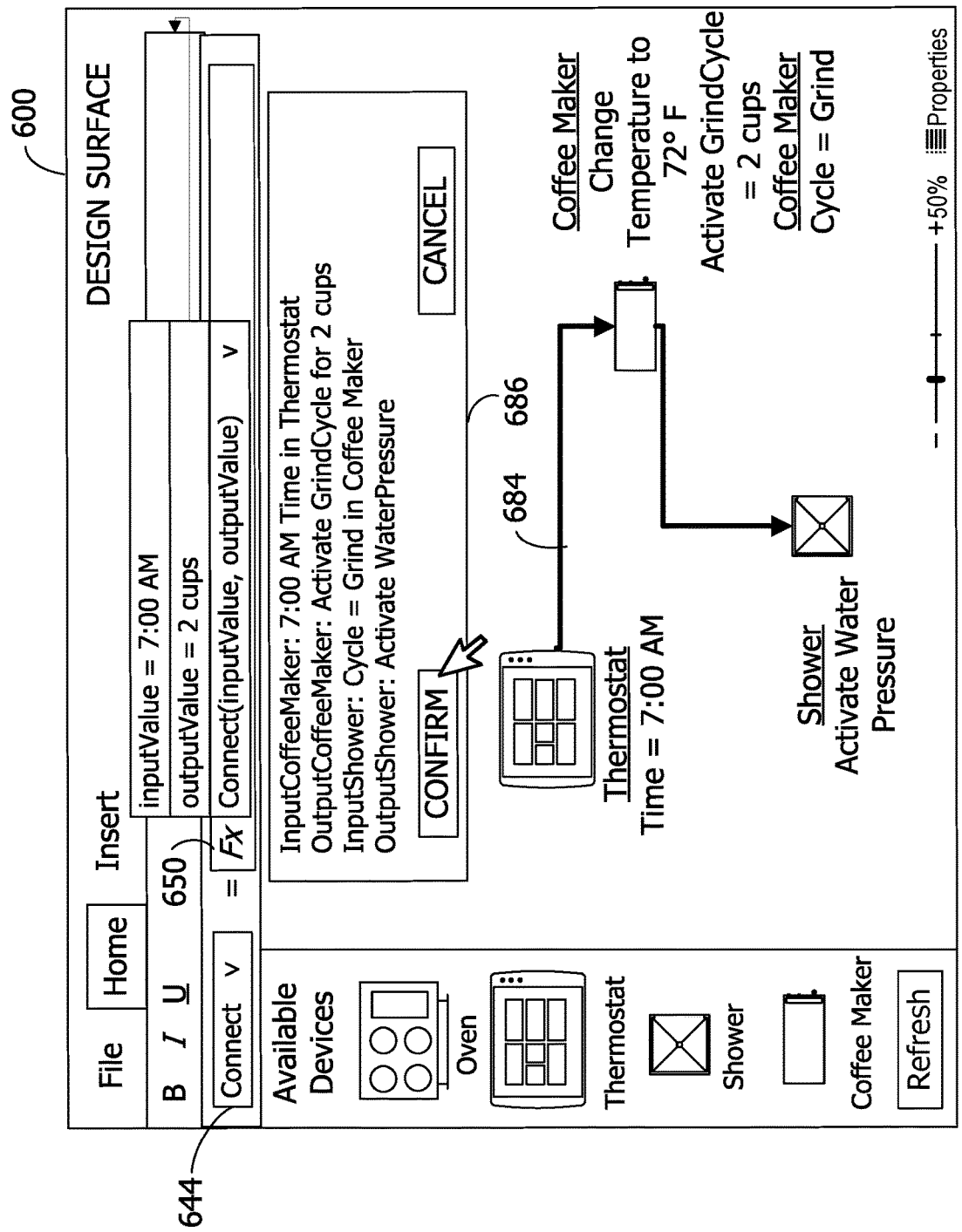

FIG. 6G depicts the chaining of the thermostat, coffee maker, and shower. A graphical representation of a connection indicator 684 provides a visual representation of the device chain being created. A confirmation request 686 may prompt a user to confirm the depicted connection is the intended connection.

ADDITIONAL EXAMPLES

In some examples, the executable code generated by the code generator for the device chain may be headless code and may be pushed to one or more hardware devices. For example, the headless code may be deployed to a smart oven, and may run at the smart oven to control output of the coffee maker or thermostat, or other device connected in the device chain.

Additionally, any device may be connected to another device or devices, regardless of the type of device or type of protocol(s) supported by the devices. In the Internet of Things (IoT), any IoT device may be selected to connect to any other IoT device, or multiple IoT devices.

User intent for generated expressions or parameters, as well as connections, and even source components and destination components, may also be inferred based on telemetry or machine learning. In an example scenario, a default connection suggestion between two devices for a user may be based upon machine learning from past user behavior, or based on telemetry for a new user.

Alternatively or in addition to the other examples described herein, examples include any combination of the following:

wherein the executable code is headless;

identifying a first device protocol associated with the first hardware device represented by the first element that is different from a second device protocol associated with the second hardware device represented by the second element;

deserializing the first device protocol and the second device protocol to generate a runtime entity that communicates via the first device protocol and the second device protocol;

compiling the automatically generated expression with the generated runtime entity to generate executable code;

obtaining device capabilities of the first hardware device corresponding to the first element;

providing the device capabilities of the first hardware device as a list of outputs associated with the first element at the design surface;

obtaining device capabilities of the second hardware device corresponding to the second element;

providing the device capabilities of the second hardware device as a list of outputs associated with the second element at the design surface;

discovering the first hardware device from a discovery service;

providing the first element representing the first hardware device at the design surface as a selectable element;

detecting user gestures at the design surface or directed to the first element and the second element at the design surface;

wherein the user interface further obtains information on device capabilities and data transport types associated with the received hardware nodes;

wherein the code generator further deserializes a declared data transport type associated with a hardware node into a runtime entity as part of the generated executable code;

wherein device capabilities of the source device are exposed as properties of the source component at the user interface, and wherein device capabilities of the destination device are exposed as properties of the destination component at the user interface;

analyzing the automatically generated function for dependencies between the source device and the destination device;

generating a dependency graph based on the analysis of the automatically generated function;

generating executable code using the dependency graph;

deploying the executable code to at least one of a cloud, the source device, the destination device, or another hardware device;

discovering the source device from a discovery service;

identifying a first device protocol associated with the first hardware device represented by the first element that is different from a second device protocol associated with the second hardware device represented by the second element;

deserializing the first device protocol and the second device protocol to generate a runtime entity that communicates via the first device protocol and the second device protocol;

compiling the automatically generated expression with the generated runtime entity to generate executable code.

In some examples, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure. In some examples, security measures may be implemented to request the developer environment and the hardware device represented by a hardware element to pair in order to input device metadata, descriptions, capabilities, events, protocol descriptions, and so forth. In this example, the developer environment may generate logic as part of the generated executable code that includes a signature exchange process for the hardware device the code will be deployed to, such that at runtime the hardware device may authorize the executable to run on the hardware device.

In some other examples, a verification provider service may be used to pair smart devices with the developer environment, such as via user credentials for examples. Aspects of the disclosure may provide for broadcast or publication of generated executables for download by another instance of the developer environment for customization by another user.

Additionally, a hardware device may serve as a function of a transformation, or as a participant in the transformation chain. For example, a device may be a node providing input and/or output in the transformation chain. In another example, a device may be a function, such that transformation of state by that device changes the state of another device. As one illustration, a smart light bulb may be connected in a transformation chain to an audio player, with parameters dictating that when the smart light dims—changing the state of the smart bulb—the volume is lowered on the audio player—changing the state of the audio player.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 7:
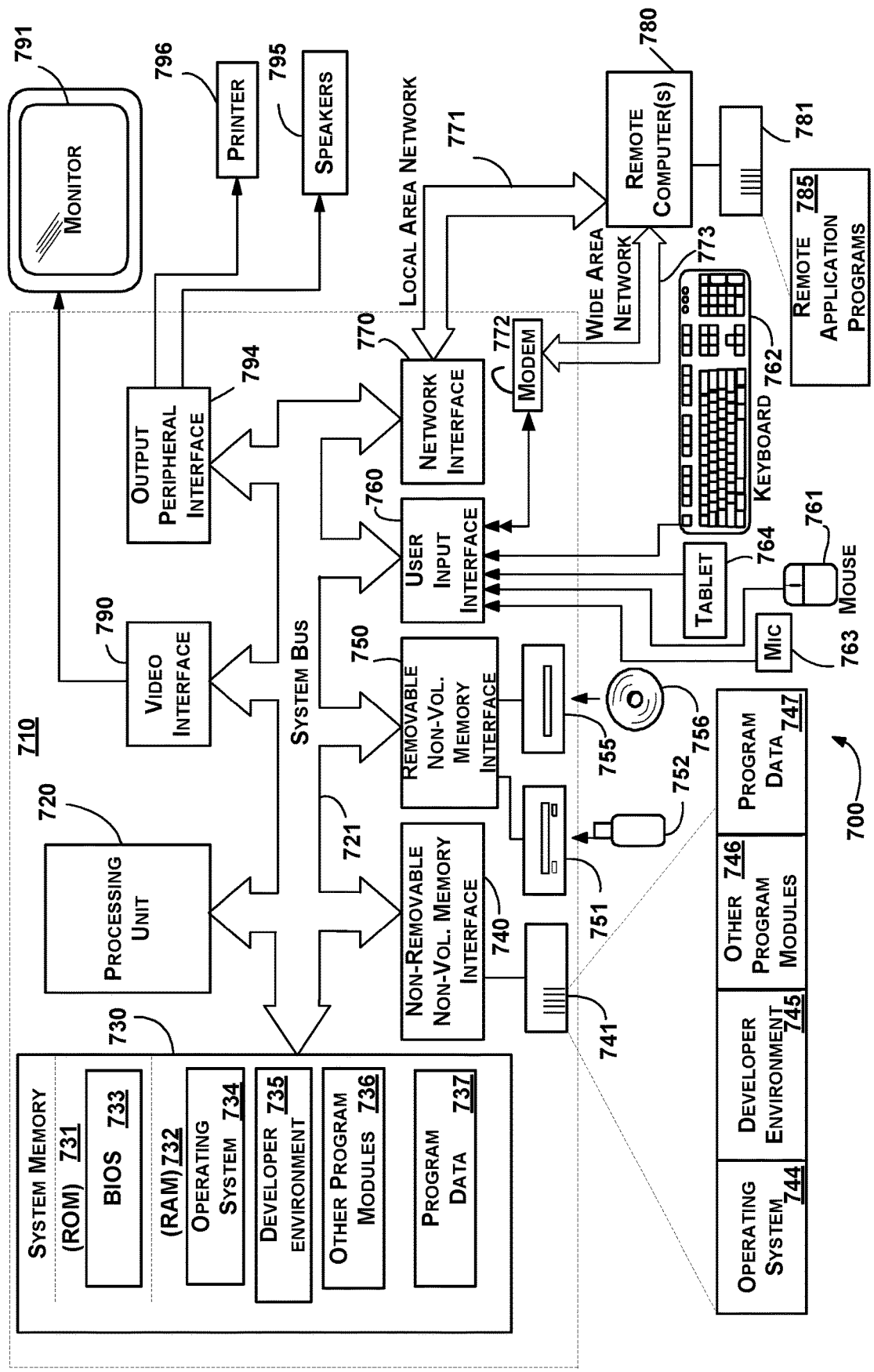
FIG. 7 is an exemplary block diagram illustrating a computing device that may be used to generate an executable program.

FIG. 7 illustrates an example of a suitable computing and networking environment 700 on which the examples of FIGS. 1-2 may be implemented. The computing system environment 700 is only one example of a suitable computing environment and is not intended to suggest any limitation as to the scope of use or functionality of the disclosure. Neither should the computing environment 700 be interpreted as having any dependency or requirement relating to any one or combination of components illustrated in the exemplary operating environment 700.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 7, an exemplary system for implementing various aspects of the disclosure may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 731 and 732 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 710. Computer storage media does not, however, include propagated signals. Rather, computer storage media excludes propagated signals. Any such computer storage media may be part of computer 710.

Communication media typically embodies computer-readable instructions, data structures, program modules, or the like, in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs, such as developer environment 735 that receives hardware elements and generates executable code to chain together hardware devices represented by the hardware elements, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a universal serial bus (USB) port 751 that provides for reads from or writes to a removable, nonvolatile memory 752, and an optical disk drive 755 that reads from or writes to a removable, nonvolatile optical disk 756 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and USB port 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, developer environment 745, other program modules 746 and program data 747. Note that these components may either be the same as or different from operating system 734, developer environment 735, other program modules 736, and program data 737. Operating system 744, developer environment 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel may be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

Figure 8:
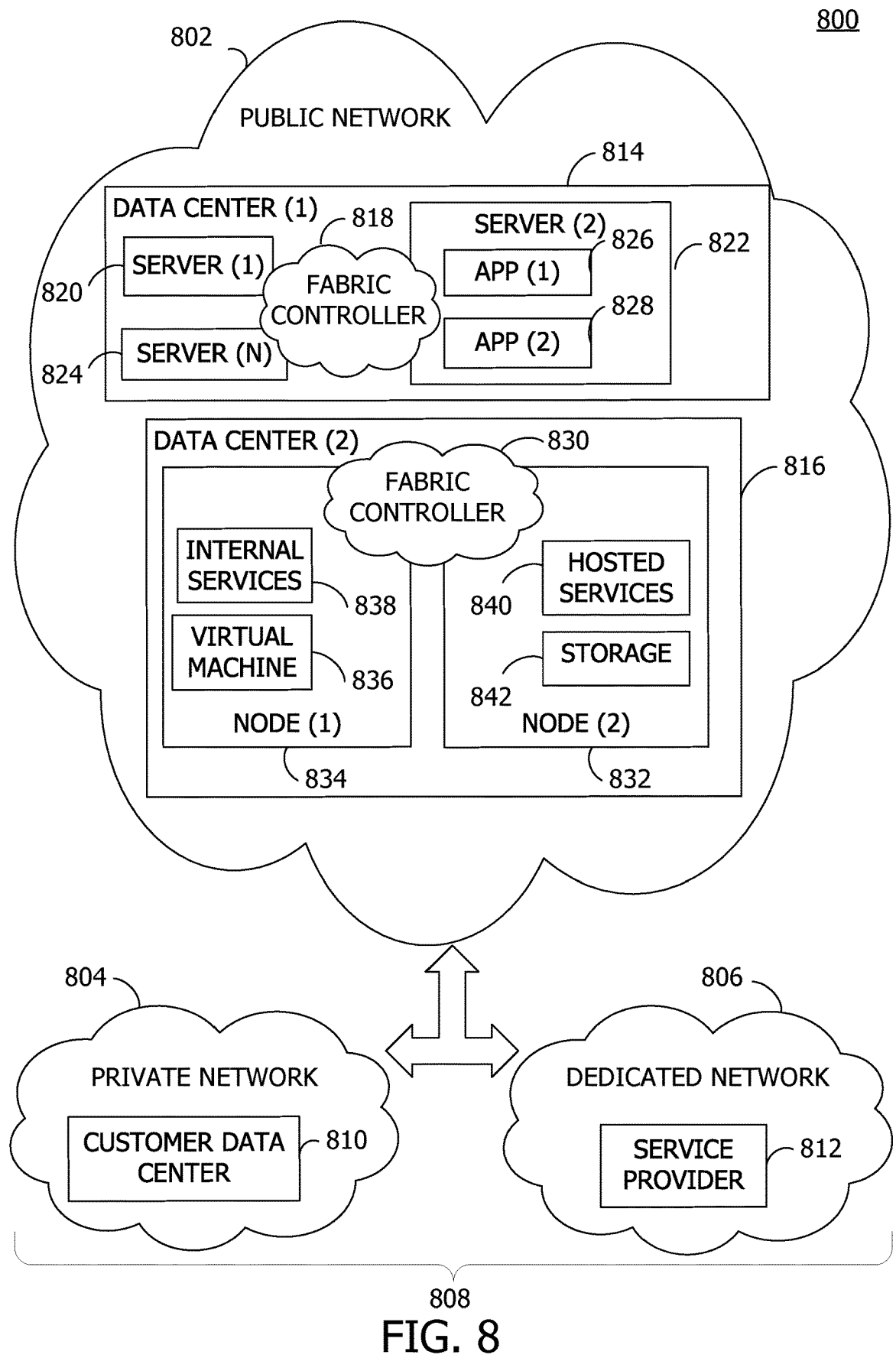
FIG. 8 is an exemplary block diagram illustrating a cloud computing device that may be used to generate an executable program.

Turning now to FIG. 8, an exemplary block diagram illustrates a cloud-computing environment for generating a device application. Architecture 800 illustrates an exemplary cloud-computing infrastructure, suitable for use in implementing aspects of the disclosure. Architecture 800 should not be interpreted as having any dependency or requirement related to any single component or combination of components illustrated therein. In addition, any number of nodes, virtual machines, data centers, role instances, or combinations thereof may be employed to achieve the desired functionality within the scope of the present disclosure.

The distributed computing environment of FIG. 8 includes a public network 802, a private network 804, and a dedicated network 806. Public network 802 may be a public cloud, for example. Private network 804 may be a private enterprise network or private cloud, while dedicated network 806 may be a third party network or dedicated cloud. In this example, private network 804 may host a customer data center 810, and dedicated network 806 may host an internet service provider 812. Hybrid cloud 808 may include any combination of public network 802, private network 804, and dedicated network 806. For example, dedicated network 806 may be optional, with hybrid cloud 808 comprised of public network 802 and private network 804.

Public network 802 may include data centers configured to host and support operations, including tasks of a distributed application, according to the fabric controller 818. It will be understood and appreciated that data center 814 and data center 816 shown in FIG. 8 is merely an example of one suitable implementation for accommodating one or more distributed applications and is not intended to suggest any limitation as to the scope of use or functionality of embodiments of the present disclosure. Neither should data center 814 and data center 816 be interpreted as having any dependency or requirement related to any single resource, combination of resources, combination of servers (e.g., server 820, server 822, and server 824) combination of nodes (e.g., nodes 832 and 834), or set of APIs to access the resources, servers, and/or nodes.

Data center 814 illustrates a data center comprising a plurality of servers, such as server 820, server 822, and server 824. A fabric controller 818 is responsible for automatically managing the servers and distributing tasks and other resources within the data center 814. By way of example, the fabric controller 818 may rely on a service model (e.g., designed by a customer that owns the distributed application) to provide guidance on how, where, and when to configure server 822 and how, where, and when to place application 826 and application 828 thereon. In one embodiment, one or more role instances of a distributed application, may be placed on one or more of the servers of data center 814, where the one or more role instances may represent the portions of software, component programs, or instances of roles that participate in the distributed application. In another embodiment, one or more of the role instances may represent stored data that is accessible to the distributed application.

Data center 816 illustrates a data center comprising a plurality of nodes, such as node 832 and node 834. One or more virtual machines may run on nodes of data center 816, such as virtual machine 836 of node 834 for example. Although FIG. 8 depicts a single virtual node on a single node of data center 816, any number of virtual nodes may be implemented on any number of nodes of the data center in accordance with illustrative embodiments of the disclosure. Generally, virtual machine 836 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine 836 may include processing capacity, storage locations, and other assets within the data center 816 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 830 is responsible for automatically managing the virtual machines running on the nodes of data center 816 and for placing the role instances and other resources (e.g., software components) within the data center 816. By way of example, the fabric controller 830 may rely on a service model (e.g., designed by a customer that owns the service application) to provide guidance on how, where, and when to configure the virtual machines, such as virtual machine 836, and how, where, and when to place the role instances thereon.

As discussed above, the virtual machines may be dynamically established and configured within one or more nodes of a data center. As illustrated herein, node 832 and node 834 may be any form of computing devices, such as, for example, a personal computer, a desktop computer, a laptop computer, a mobile device, a consumer electronic device, server(s), the computing device 700 of FIG. 7, and the like. In one instance, the nodes host and support the operations of the virtual machines, while simultaneously hosting other virtual machines carved out for supporting other tenants of the data center 816, such as internal services 838 and hosted services 840. Often, the role instances may include endpoints of distinct service applications owned by different customers.

Typically, each of the nodes include, or is linked to, some form of a computing unit (e.g., central processing unit, microprocessor, etc.) to support operations of the component (s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications, and may be interconnected via application programming interfaces (APIs). In one instance, one or more of these interconnections may be established via a network cloud, such as public network 802. The network cloud serves to interconnect resources, such as the role instances, which may be distributably placed across various physical hosts, such as nodes 832 and 834. In addition, the network cloud facilitates communication over channels connecting the role instances of the service applications running in the data center 816. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

While the aspects of the disclosure have been described in terms of various examples with their associated operations, a person skilled in the art would appreciate that a combination of operations from any number of different examples is also within scope of the aspects of the disclosure.

The term "tethered" as used herein refers, in some examples, to situations where one device acts as an access point for another device for network access. A tethered connection may occur over a wired connection or a wireless connection. The term "Wi-Fi" as used herein refers, in some examples, to a wireless local area network using high frequency radio signals for the transmission of data. The term "ZIGBEE®" as used herein refers, in some examples, to a wireless technology standard for exchanging data using short wavelength radio transmission over short distances. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data that may be monitored and/or collected from users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although described in connection with an exemplary computing system environment, examples of the disclosure are capable of implementation with numerous other general purpose or special purpose computing system environments, configurations, or devices. In examples involving a general-purpose computer, aspects of the disclosure transform the general-purpose computer into a special-purpose computing device when configured to execute the instructions described herein.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The examples illustrated and described herein as well as examples not specifically described herein but within the scope of aspects of the disclosure constitute exemplary means for generating an executable program. For example, the elements illustrated in FIGS. 1-2 and 7-8, such as when encoded to perform the operations illustrated in FIGS. 3-4, constitute exemplary means for receiving a first element representing a first hardware device at a design surface of a computing device user interface, exemplary means for receiving a second element representing a second hardware device at the design surface, exemplary means for receiving a selection of an output associated with the first element, exemplary means for automatically generating a function that binds a property of the second element to a property of the output associated with the first element, and exemplary means for displaying the automatically generated function at the design surface.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
receiving, by a first hardware device having a first communication protocol that is different from a second communication protocol of a second hardware device, a device program having an automatically generated expression that is compiled with a runtime entity configured to communicate via a first device protocol and a second device protocol according to a deserialized first device protocol and a deserialized second device protocol, wherein the device program binds a transformable state of the second hardware device to a selected state of the first hardware device;
executing, by the first hardware device, the received device program, wherein the device program creates a transformation device chain from the first hardware device to the second hardware device that communicates data from the first hardware device to the second hardware device according to the transformation device chain despite the first communication protocol being different from the second communication protocol; and
in accordance with the first hardware device transitioning into the selected state, sending, by the first hardware device via the created transformation device chain, a communication to the second hardware device requesting the second hardware device perform functionality to transform into the transformable state.

2. The method of claim 1, further comprising:
deploying the device program to a cloud, wherein the device program is headless code.

3. The method of claim 1, wherein the device program comprises a published device chain file downloaded to first and second hardware devices.

4. The method of claim 1 further comprising:
deserializing the first communication protocol and the second communication protocol to generate a runtime entity that communicates via the first communication protocol and the second communication protocol, wherein the automatically generated expression is complied with the generated runtime entity to generate the device program.

5. The method of claim 1, further comprising:
obtaining device capabilities of the first hardware device; and
providing the device capabilities of the first hardware device as a list of outputs associated with a first element at a design surface.

6. The method of claim 1, further comprising:
obtaining device capabilities of the second hardware device; and
providing the device capabilities of the second hardware device as a list of outputs associated with a second element at a design surface.

7. The method of claim 1, further comprising:
discovering the first hardware device from a discovery service; and
providing a first element representing the first hardware device at a design surface as a selectable element.

8. The method of claim 1, further comprising:
detecting user gestures at a design surface or directed to a first element and a second element at the design surface, the first element representing the first hardware device and the second element representing the second hardware device.

9. A hardware device that chains to a second hardware device, the hardware device comprising:
a processor configured to:
communicate according to a first communication protocol that is different from a second communication protocol of the second hardware device, and
receive a device program having an automatically generated expression that is compiled with a runtime entity configured to communicate via a first device protocol and a second device protocol according to a deserialized first device protocol and a deserialized second device protocol, wherein the device program binds a transformable state of the second hardware device to a selected state of the hardware device; and
a memory that stores the received device program,
wherein the processor is further configured to:
execute the received device program to create a transformation device chain from the hardware device to the second hardware device, wherein the transformation device chain communicates data from the hardware device to the second hardware device according to the transformation device chain despite the first communication protocol being different from the second communication protocol; and
in accordance with the hardware device transitioning into the selected state, send, via the created transformation device chain, a communication to the second hardware device requesting the second hardware device perform functionality to transform into the transformable state.

10. The hardware device of claim 9, wherein the device program comprises a published device chain file downloaded to the hardware device.

11. The hardware device of claim 9, wherein the device program is headless code.

12. One or more computer storage media, having computer-executable instructions for generating an executable program, which on execution by a first hardware device, causes the first hardware device to perform operations, comprising:
receive a device program having an automatically generated expression that is compiled with a runtime entity configured to communicate via a first device protocol and a second device protocol according to a deserialized first device protocol and a deserialized second device protocol, wherein the device program binds a transformable state of a second hardware device to a selected state of the first hardware device, whereby the first hardware device has a first communication protocol that is different from a second communication protocol of the second hardware device;
execute the received device program, wherein the device program creates a transformation device chain from the first hardware device to the second hardware device that communicates data from the first hardware device to the second hardware device according to the transformation device chain despite the first communication protocol being different from the second communication protocol; and
in accordance with the first hardware device transitioning into the selected state, send, via the created transformation device chain, a communication to the second hardware device requesting the second hardware device to perform functionality to transform into the transformable state.

13. The one or more computer storage media of claim 12, wherein the device program is deployed to a cloud, and the device program is headless code.

14. The one or more computer storage media of claim 12, wherein the device program comprises a published device chain file downloaded to the first hardware device.

15. The one or more computer storage media of claim 12 further comprising:
deserializing the first communication protocol and the second communication protocol to generate a runtime entity that communicates via the first communication protocol and the second communication protocol, wherein the automatically generated expression is complied with the generated runtime entity to generate the device program.

16. The one or more computer storage media of claim 12, further comprising:
obtaining device capabilities of the first hardware device; and
providing the device capabilities of the first hardware device as a list of outputs associated with a first element at a design surface.

17. The one or more computer storage media of claim 12, further comprising:
obtaining device capabilities of the second hardware device; and
providing the device capabilities of the second hardware device as a list of outputs associated with a second element at a design surface.

18. The one or more computer storage media of claim 12, further comprising:
discovering the first hardware device from a discovery service; and
providing a first element representing the first hardware device at a design surface as a selectable element.

19. The one or more computer storage media of claim 12, further comprising:
detecting user gestures at a design surface or directed to a first element and a second element at the design surface, the first element representing the first hardware device and the second element representing the second hardware device.

20. The one or more computer storage media of claim 12, further comprising:
analyzing the automatically generated expression for dependencies between the first hardware device and the second hardware device; and
generating a dependency graph based on the analysis of the automatically generated expression.

* * * * *